(12) United States Patent
Yoshida et al.

(10) Patent No.: US 8,054,334 B2
(45) Date of Patent: Nov. 8, 2011

(54) IMAGING APPARATUS AND IMAGING METHOD

(75) Inventors: Chisato Yoshida, Saitama (JP); Osamu Date, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/291,581

(22) Filed: Nov. 12, 2008

(65) Prior Publication Data

US 2009/0073269 A1    Mar. 19, 2009

Related U.S. Application Data

(63) Continuation of application No. 10/496,890, filed as application No. PCT/JP03/09633 on Jul. 30, 2003.

(30) Foreign Application Priority Data

Sep. 25, 2002    (JP) ................ P2002-279219

(51) Int. Cl.
*H04N 5/225* (2006.01)
*H04N 7/14* (2006.01)
*H04N 5/222* (2006.01)
*H04N 5/232* (2006.01)

(52) U.S. Cl. ............ 348/207.99; 348/14.12; 348/14.13; 348/333.01; 348/211.1

(58) Field of Classification Search ............. 348/207.99, 348/333.01–333.11, 14.12–14.13, 211.1, 348/211.2, 222.1
See application file for complete search history.

(56) References Cited

U.S. PATENT DOCUMENTS

| | | | |
|---|---|---|---|
| 4,926,415 A | | 5/1990 | Tawara et al. |
| 5,170,466 A | * | 12/1992 | Rogan et al. ............. 715/255 |
| 5,195,136 A | | 3/1993 | Hardy et al. |
| 5,832,300 A | | 11/1998 | Lowthert |
| 5,841,471 A | | 11/1998 | Endsley et al. |
| 5,969,750 A | | 10/1999 | Hsieh et al. |
| 5,983,263 A | | 11/1999 | Rothrock et al. |

(Continued)

FOREIGN PATENT DOCUMENTS

| | | | |
|---|---|---|---|
| JP | 2249333 | | 10/1990 |
| JP | 08340314 A | * | 12/1996 |
| JP | 10-98642 A1 | | 4/1998 |
| JP | 10-98642 A1 | | 4/1998 |
| JP | 2001-36655 A1 | | 2/2001 |
| JP | 2001-36655 A1 | | 2/2001 |
| JP | 2001-148802 A1 | | 5/2001 |
| JP | 2001-148802 A1 | | 5/2001 |
| JP | 2002-33947 A1 | | 1/2002 |

(Continued)

OTHER PUBLICATIONS

Supplementary European Search Report, EP 03 79 8370, dated Aug. 5, 2009.

*Primary Examiner* — Nhan T Tran
*Assistant Examiner* — Tuan Le
(74) *Attorney, Agent, or Firm* — Lerner, David, Littenberg, Krumholz & Mentlik, LLP

(57) ABSTRACT

An imaging apparatus and an imaging method supply an optimum amount of image data to another apparatus. When a PDA has a maximum transfer rate of 1.5 Mbps, a mobile phone determines that the maximum speed of communication with the PDA is low, reduces the amount of moving image data captured by a CCD of the mobile phone accordingly, and supplies the captured moving image data to the PDA. The PDA therefore displays a low-quality moving image on its display unit. When the PDA has a maximum transfer rate of 480 Mbps, the CPU of the mobile phone leaves unchanged the amount of moving picture data captured by the CCD and supplies the captured moving image data to the PDA. The PDA then displays a high-quality moving image on its display unit. The foregoing may be advantageously applied to digital cameras.

4 Claims, 22 Drawing Sheets

U.S. PATENT DOCUMENTS

| | | | |
|---|---|---|---|
| 6,000,864 A | 12/1999 | Hanada | |
| 6,002,429 A | 12/1999 | Ochi et al. | |
| 6,091,777 A * | 7/2000 | Guetz et al. | 375/240.11 |
| 6,337,928 B1 * | 1/2002 | Takahashi et al. | 382/236 |
| 6,342,922 B1 | 1/2002 | Mizoguchi et al. | |
| 6,512,541 B2 * | 1/2003 | Dunton et al. | 348/230.1 |
| 6,522,352 B1 * | 2/2003 | Strandwitz et al. | 348/211.2 |
| 6,832,102 B2 | 12/2004 | I'Anson et al. | |
| 2002/0158991 A1 * | 10/2002 | Kobayashi et al. | 348/723 |
| 2004/0028138 A1 | 2/2004 | Piche et al. | |

FOREIGN PATENT DOCUMENTS

| | | |
|---|---|---|
| JP | 2002-33947 A1 | 1/2002 |
| JP | 2002-99393 A1 | 4/2002 |
| JP | 2002-99393 A1 | 4/2002 |
| JP | 2003-69988 A1 | 3/2003 |
| JP | 2003-69988 A1 | 3/2003 |
| JP | 2003-169284 A1 | 6/2003 |
| JP | 2003-169284 A1 | 6/2003 |
| JP | 2003-274049 A1 | 9/2003 |
| JP | 2003-274049 A1 | 9/2003 |

* cited by examiner

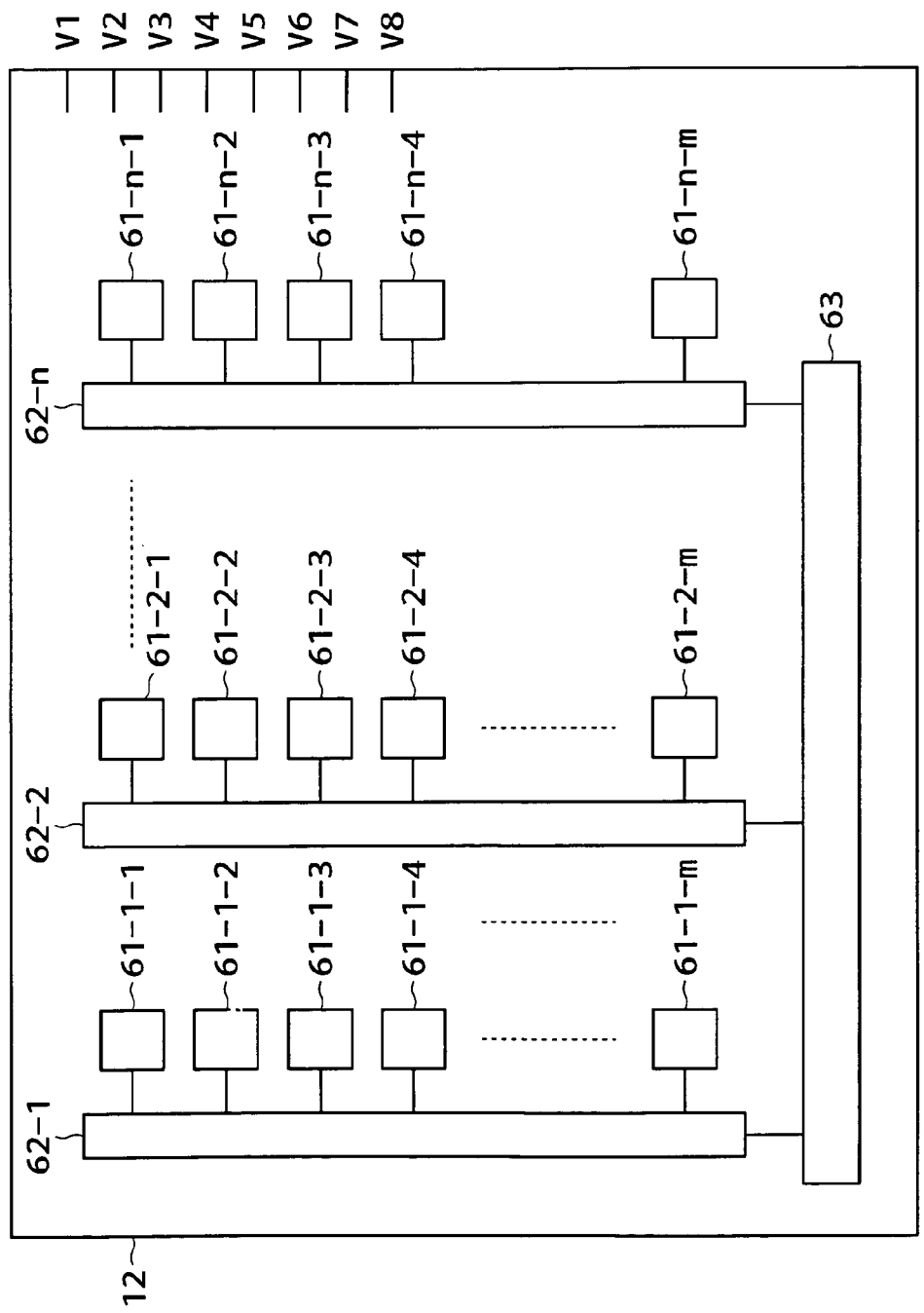

F I G. 1 3
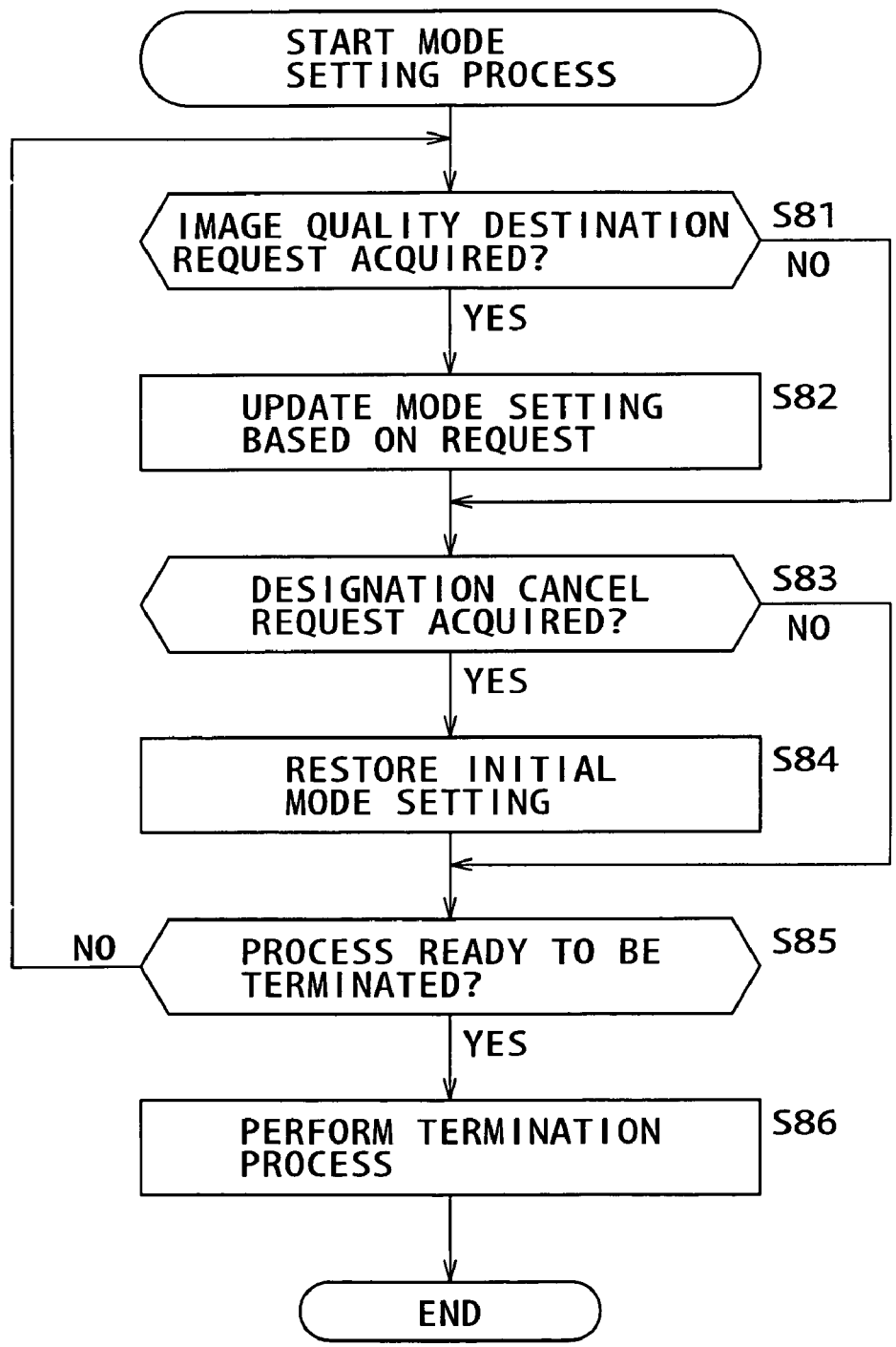

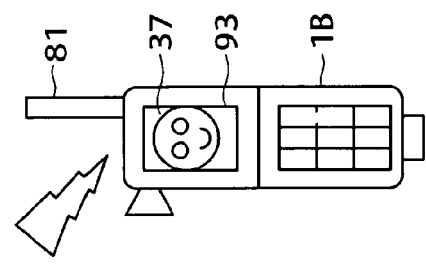
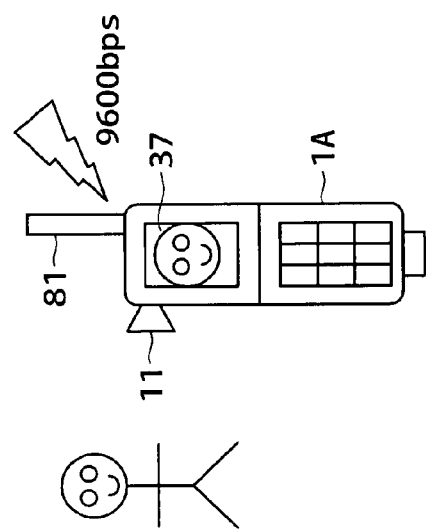
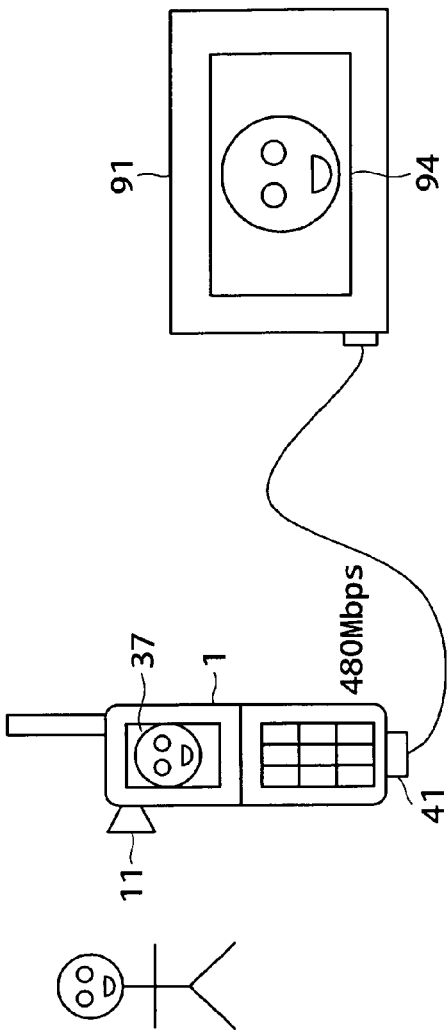
FIG.14A
FIG.14B

F I G. 1 5
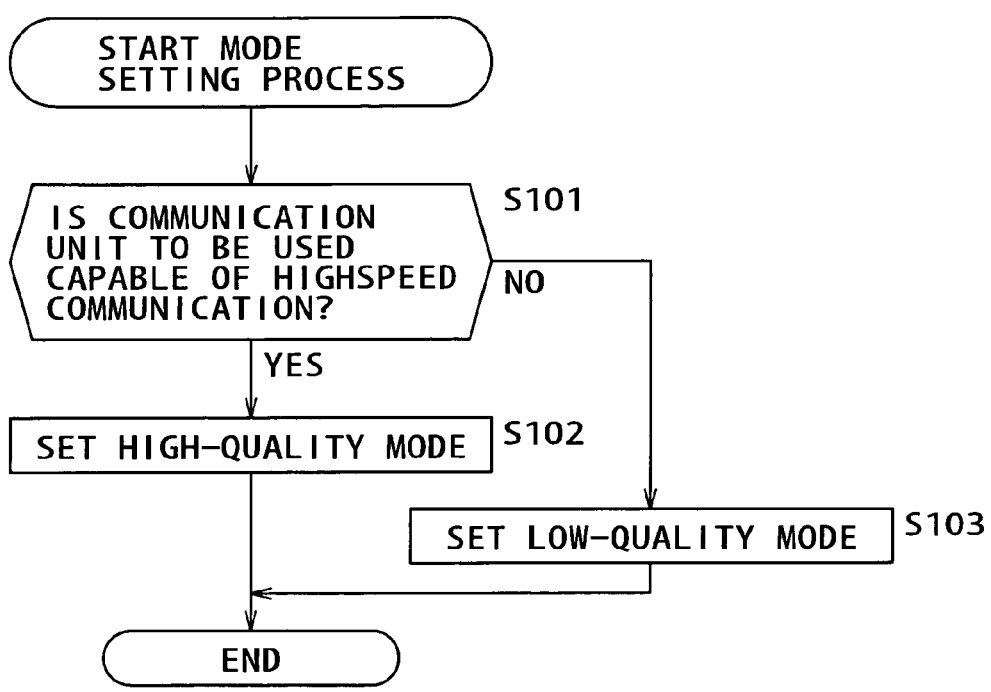

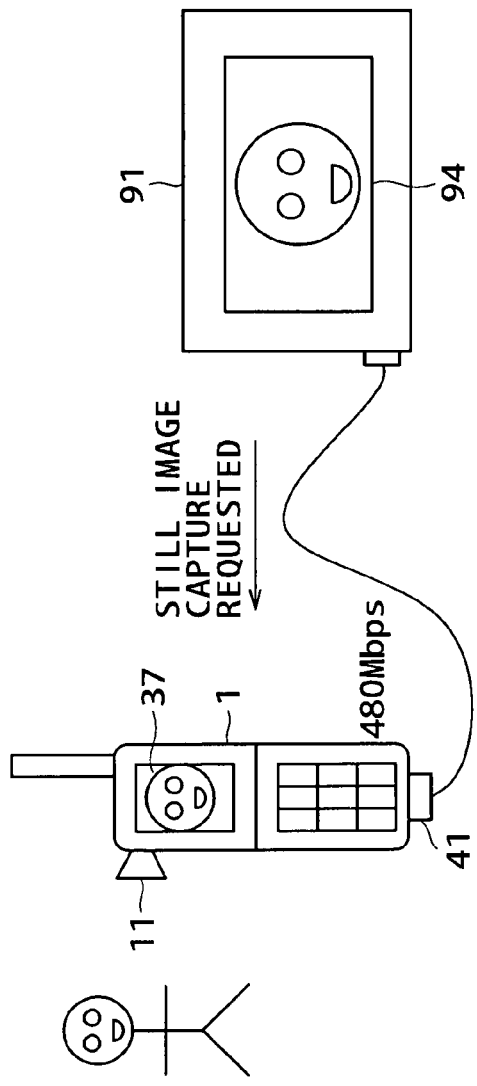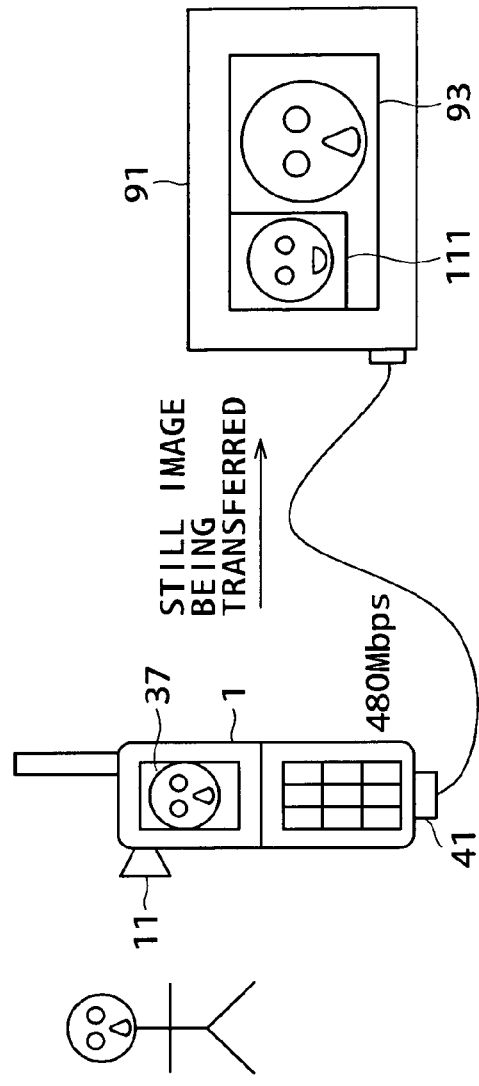

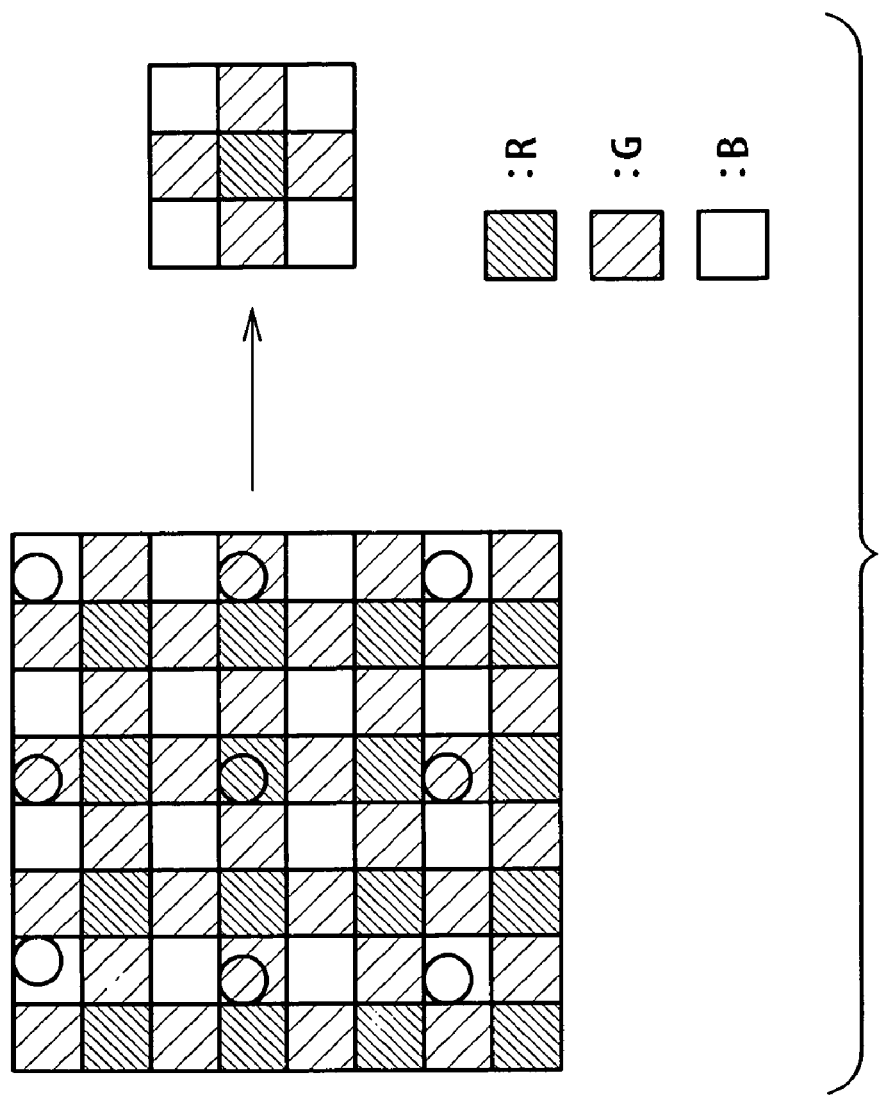
F I G. 2 2

IMAGING APPARATUS AND IMAGING METHOD

CROSS-REFERENCE TO RELATED APPLICATIONS

This application is a continuation of U.S. application Ser. No. 10/496,890, filed Feb. 23, 2005, the disclosure of which is incorporated herein by reference.

BACKGROUND OF THE INVENTION

The present invention relates to an imaging apparatus and an imaging method. More specifically, the invention relates to an imaging apparatus and an imaging method for supplying an optimum amount of image data to another apparatus.

The popularization in recent years of imaging apparatus, such as digital video cameras, has entailed significant improvements in the resolution of camera equipment, such as the incorporation of a CCD (charge-coupled device) in each apparatus. There also is a recent trend toward a growing number of feature-rich models of imaging apparatus represented by digital video cameras furnished with a communication function and mobile phones with an imaging function.

Typically, a digital video camera equipped with a USB (Universal Serial Bus) communication function is capable of obtaining moving image data about a given object and supplying the moving image data thus acquired in real time to another apparatus, such as a personal computer, via a USB cable.

The higher the camera resolution, the greater the amount of moving image data obtained by imaging the object.

Where a data-receiving destination apparatus has a low processing capability or where network congestion between the sending and the receiving apparatuses are lowering transfer rates, the growing data quantity can lead to overflows of communication processes or missing frames in reproduced moving images.

A proposed solution to these problems involves causing the data-sending digital video camera to reduce beforehand the amount of outgoing moving image data, such as by compressing the data, so that moving image data can be supplied normally to their destination at reduced transfer rates. This solution, however, unnecessarily degrades the quality of reproduced moving images in cases where high-speed communication is available.

Another proposed solution involves preparing two kinds of data, i.e., first data, and second data acquired by compressing the first data. When the transfer rate is high the first data is supplied, but the lower quality second data can be supplied if the transfer rate turns out to be low. (For example, refer to Japanese Patent Laid-open No. 2002-99393, pp. 4-12, furnished with FIG. 4.)

The second solution has its own disadvantages. Because the two categories of data (i.e., first image data, and second image data which correspond to the first in content and which have the smaller quantity) need to be provided in advance, an ever-growing storage area must be allocated to accommodate the data to be supplied. Another disadvantage is that the second solution is not fit for applications where moving image data about the object are to be supplied in real time.

A further disadvantage is that the compression rate of the prepared second image data may or may not be suitable for the ongoing status of communication.

SUMMARY OF THE INVENTION

The present invention has been made in view of the above circumstances and provides an imaging apparatus and an imaging method for supplying an optimum amount of image data to another apparatus.

In carrying out the invention and according to one aspect thereof, there is provided a first imaging apparatus, including imaging means for capturing image data of an object; transmitting means for transmitting the captured image data to a communication device via a network; and adjusting means for adjusting an amount of the image data captured by the imaging means based on a communication speed at which the captured image data are transmitted by the transmitting means.

Preferably, the first imaging apparatus may further include a plurality of units of the transmitting means; and selecting means for selecting any one of the plurality of units of the transmitting means; wherein the adjusting means may adjust the amount of the image data captured by the imaging means based on the communication speed at which the captured image data are transmitted by the unit of the transmitting means selected by the selecting means.

Preferably, the transmitting means further transmits data other than the captured image data; and the adjusting means reduces the amount of the image data captured by the imaging means when the transmitting means transmits the other data.

According to another aspect of the invention, there is provided a first imaging method, including capturing image data of an object; transmitting the captured image data to a communication device via a network; and adjusting an amount of the image data captured in the capturing step based on a communication speed at which the captured image data are transmitted in the transmitting step.

Preferably, the first imaging method may further include selecting any one of a plurality of transmitting units for transmitting the captured image data, wherein the transmitting step includes controlling the transmission so that the captured image data is transmitted by the selected transmission unit; and the adjusting step adjusts the amount of the image data captured in the capturing step based on the communication speed at which the captured image data are transmitted by the selected transmission unit.

Preferably, the transmitting step of the first imaging method further includes transmitting data other than the captured image data; and the adjusting step reduces the amount of the image data captured in the capturing step when the transmitting step transmits the other data.

According to a further aspect of the invention, there is provided a second imaging apparatus, including imaging means for capturing image data of an object; compressing means for compressing the captured image data; transmitting means for transmitting the compressed image data to a communication device via a network; and adjusting means for adjusting a compression rate for compressing the captured image data based on a communication speed at which the compressed image data are transmitted by the transmitting means.

Preferably, the second imaging apparatus may further include a plurality of units of the transmitting means; and selecting means for selecting any one of the plurality of units of the transmitting means; wherein the adjusting means adjusts the compression rate based on the communication speed at which the compressed image data are transmitted by the unit of the transmitting means selected by the selecting means.

Preferably, the transmitting means of the second imaging apparatus further transmits data other than the compressed image data; and the adjusting means raises the compression rate when the transmitting means transmits the other data.

According to an even further aspect of the invention, there is provided a second imaging method, including capturing image data of an object; compressing the captured image data; transmitting the compressed image data to a communication device via a network; and adjusting a compression rate for compressing the captured image data based on a communication speed at which the compressed image data are transmitted in the transmitting step.

Preferably, the second imaging method may further include selecting any one of a plurality of transmitting units for transmitting the compressed image data, wherein the transmitting step includes controlling the transmission so that the compressed image data is transmitted by the selected transmission unit; and the adjusting step adjusts the compression rate based on the communication speed at which the compressed image data are transmitted by the selected transmission unit.

Preferably, the transmitting step of the second imaging method may further include transmitting data other than the compressed image data, and the adjusting step raises the compression rate when the transmitting step transmits the other data.

According to a still further aspect of the invention, there is provided a third imaging apparatus, including imaging means for capturing image data of an object; compressing means for compressing the captured image data; transmitting means for transmitting the compressed image data to a communication device via a network; and adjusting means for adjusting an amount of the image data captured by the imaging means and a compression rate for compressing the captured image data based on a communication speed at which the compressed image data are transmitted by the transmitting means.

Preferably, the third imaging apparatus may further include a plurality of units of the transmitting means; and selecting means for selecting any one of the plurality of units of the transmitting means; wherein the adjusting means adjusts the amount of the image data captured by the imaging means and the compression rate based on the communication speed at which the compressed image data are transmitted by the unit of the transmitting means selected by the selecting means.

Preferably, the transmitting means of the third imaging apparatus further transmits data other than the compressed image data, and the adjusting means reduces the amount of the image data captured by the imaging means while raising the compression rate when the transmitting means transmits the other data.

According to a yet further aspect of the invention, there is provided a third imaging method, including capturing image data of an object; compressing the captured image data; transmitting the compressed image data to a communication device via a network; and adjusting an amount of the image data captured in the capturing step and a compression rate for compressing the captured image data based on a communication speed at which the compressed image data are transmitted in the transmitting step.

Preferably, the third imaging method may further include selecting any one of a plurality of transmitting units for transmitting the compressed image data, wherein the transmitting step includes controlling the transmission so that the compressed image data is transmitted by the selected transmission unit; and the adjusting step adjusts the amount of the image data captured in the capturing step and the compression rate based on the communication speed at which the compressed image data are transmitted by the selected transmission unit.

Preferably, the transmitting step of the third imaging method further includes transmitting data other than the compressed image data; and the adjusting step reduces the amount of the image data captured in the capturing step while raising the compression rate when the transmitting step transmits the other data.

Where the first imaging apparatus and first imaging method according to the invention are in use, the image data about a given object are captured and transmitted to a communication device via a network. The amount of the image data captured is adjusted based on the communication speed at which the captured image data are transmitted.

Where the second imaging apparatus and second imaging method according to the invention are in use, the image data about a given object are captured and compressed. The compressed image data are transmitted to a communication device via a network. The compression rate for compressing the captured image data is adjusted based on the communication speed at which the compressed image data are transmitted.

Where the third imaging apparatus and third imaging method according to the invention are in use, the image data about a given object are captured and compressed. The compressed image data are transmitted to a communication device via a network. The amount of the image data captured and the compression rate for compressing the captured image data are adjusted based on the communication speed at which the compressed image data are transmitted.

BRIEF DESCRIPTION OF THE DRAWINGS

FIG. 2 is a schematic view depicting the major internal structure of a CCD in the mobile phone of FIG. 1;

FIG. 13 is a flowchart of steps constituting a process of setting a moving image capture mode based on a request from the party receiving moving image data;

FIG. 14A is a schematic view of still another typical system configuration for displaying image data acquired by the mobile phone in FIG. 1;

FIG. 14B is a schematic view of still another typical system configuration for displaying image data acquired by the mobile phone in FIG. 1;

FIG. 15 is a flowchart of steps constituting a mode setting process applicable to the system configurations of FIGS. 14A and 14B;

FIG. 16A is a schematic view of yet another typical system configuration for displaying image data acquired by the mobile phone in FIG. 1;

FIG. 16B is a schematic view of yet another typical system configuration for displaying image data acquired by the mobile phone in FIG. 1;

FIG. 22 is a schematic view showing how the amount of image data is reduced using the CMOS sensor of FIG. 21.

DETAILED DESCRIPTION

Figure 1:
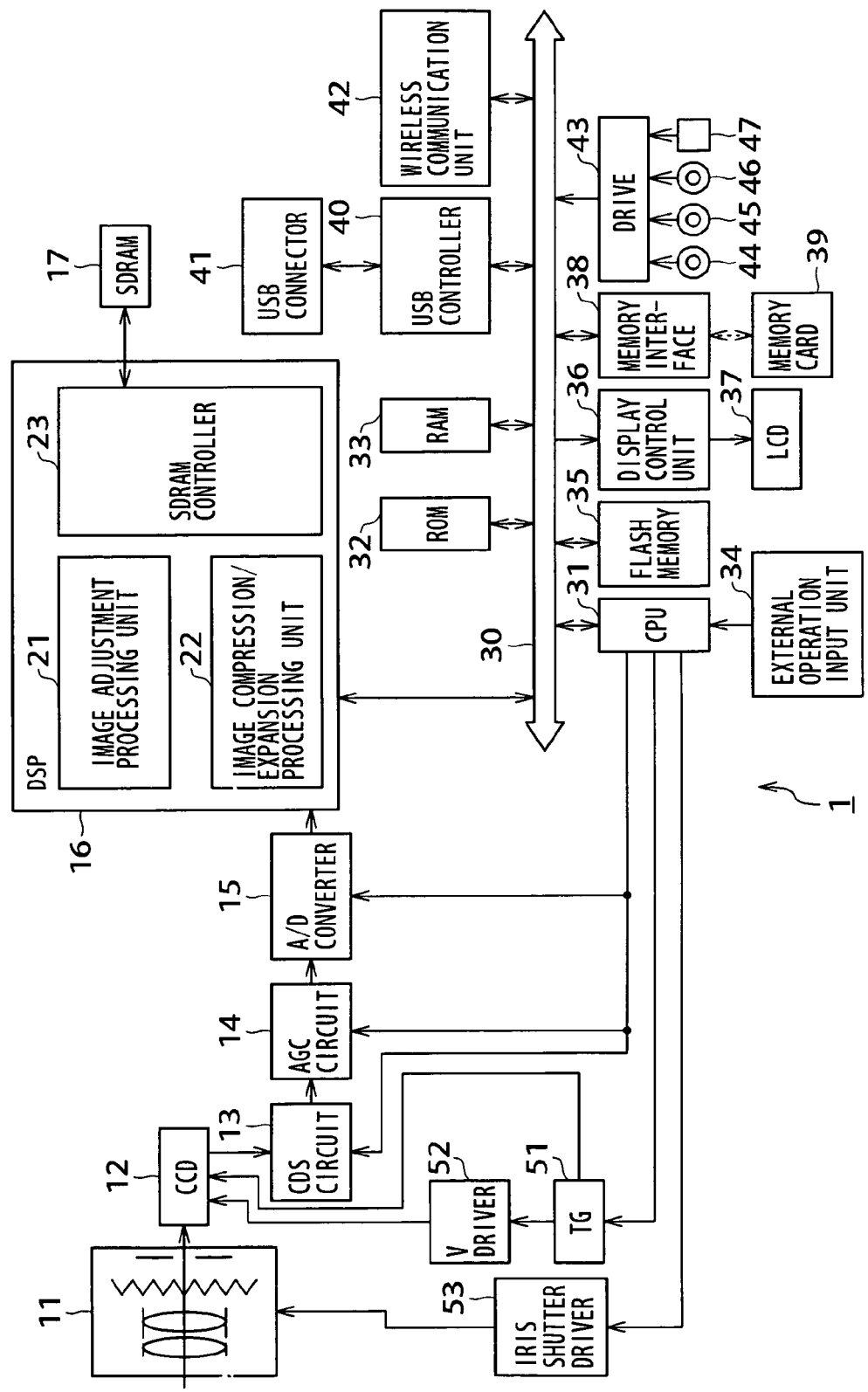
FIG. 1 is a block diagram showing the basic structure of a mobile phone equipped with a camera function according to the invention.

FIG. 1 is a block diagram showing the basic structure of a mobile phone equipped with a camera function according to the invention.

Light from an object, not shown, enters a CCD (charge-coupled device) 12 through a lens unit 11 of the mobile phone 1 that includes lenses and an iris mechanism. The entered light is subjected to a photoelectric conversion process.

A video signal output by the CCD 12 is supplied to a CDS (correlated double sampling) circuit 13. This circuit removes noise components from the input signal by submitting the signal to a correlated double sampling process. The signal thus processed is output to an AGC (automatic gain control) circuit 14. The AGC circuit 14 controls the gain of the input signal before outputting the controlled signal to an A/D (analog/digital) converter 15. The A/D converter 15 converts the input analog signal to a digital signal that is output to a DSP (digital signal processor) 16.

The DSP 16 generates control signals such as AF (auto focus), AE (auto exposure) and AWB (auto white balance) using an incorporated image adjustment processing unit 21, and sends the generated control signals to a CPU (central processing unit) 31 through a bus 30. The DSP 16 also compresses or expands an input image signal using an internal image compression/expansion processing unit 22. During a compression/expansion process, the image compression/expansion processing unit 22 places the video signal temporarily in an SDRAM (synchronous dynamic random access memory) 17 under control of an SDRAM controller 23 incorporated in the DSP 16.

The image data compressed by the image compression/expansion processing unit 22 are fed to a RAM (random access memory) 33 or elsewhere via the bus 30.

The CPU 31 controls component units of the mobile phone and performs various processes in keeping with programs that are held in a ROM (read only memory) 32 or loaded from a storage unit 35 into the RAM 33. The RAM 33 may also accommodate data required by the CPU 31 in carrying out diverse processes.

The CPU 31 is also connected to an external operation input unit 34 that may be operated by a user. The external operation input unit 34 is made up of buttons, such as a shutter button and a menu button, and other controls including dials, knobs, and a touch-sensitive panel (none shown). When operated by the user, the external operation input unit 34 receives various instructions from the user and supplies instruction information to the CPU 31. Given the instruction information, the CPU 31 performs various processes accordingly.

The CPU 31, ROM 32, and RAM 33 are interconnected via the bus 30. The bus 30 is further connected to: a flash memory 35 composed illustratively of a nonvolatile semiconductor memory; a display control unit 36 that controls images to be displayed on an LCD 37; a memory interface 38 to which a memory card 39 or the like is attached; a USB (universal serial bus) controller 40 for controlling a USB connector 41 to which a USB cable, not shown, is connected; and a wireless communication unit 42 that transmits the image data captured by the CCD 12 wirelessly to another apparatus under control of the CPU 31.

The display control unit 36 incorporates a VRAM (video random access memory), not shown. The display control unit 36 stores the image data captured by the CCD 12 in the internal VRAM, and causes the LCD 37 to display images corresponding to the image data thus held in the VRAM or in other memories (e.g., RAM 33, flash memory 35, or memory card 39 connected to the memory interface 38).

A drive 43 is connected as needed to the bus 30 via an interface, not shown. Computer programs are retrieved from a magnetic disc 44, an optical disc 45, a magneto-optical disc 46 or a semiconductor memory 47 loaded in the drive 43 and are installed into the RAM 33 or flash memory 35. Computer programs may also be retrieved from the memory card 39 attached as needed to the memory interface 38 and installed into the RAM 33 or flash memory 35.

The CPU 31 receives instruction information from the user through the external operation input unit 34, control information from the image adjustment processing unit 21, or information derived from the execution of various programs. Based on the received information, the CPU 31 controls the operations of the CDS circuit 13, AGC circuit 14, and A/D converter 15.

A method by which to transmit acquired image data to another apparatus is selected according to the instructions input by the user through the external operation input unit 34. More specifically, by operating the external operation input unit 34 in the setup of FIG. 1, the user may determine at will whether the image data are to be transmitted through the USB connector 41 or through the wireless communication unit 42. Based on the communication method thus selected, the CPU 31 controls a TG (timing generator) 51 for regulating the operation of the CCD 12 in order to control the amount of image data captured by the CCD 12. The CPU 31 also controls the rate at which the image data are compressed by the DSP 16 in accordance with the selected communication method.

The CPU 31 controls the TG 51 for regulating the operation of the CCD 12 based on either a communication speed for wired communication by the USB controller 40, a communication speed for wireless communication by the wireless communication unit 42, a request from the apparatus the mobile phone 1 is communicating with, or instructions input through the external operation input unit 34. In so doing, the CPU 31 controls the amount of image data captured by the CCD 12, the compression rate for a compression process by the image compression/expansion processing unit 22 compressing the image data, and the amount of image data to be transmitted.

Furthermore, the CPU 31 controls an iris shutter driver 53 for regulating the operation of the lens unit 11, thereby adjusting the shutter speed and regulating the iris mechanism.

The TG 51 and a V driver 52 are connected to the CCD 12. Linked via a serial control bus to the CPU 31 and controlled thereby, the TG 51 and V driver 52 control the workings of the CCD 12.

Specifically, based on control signals from the CPU 31, the TG 51 generates various control signals including a horizontal clock signal for driving a horizontal shift register 63 of the CCD 12, to be described later with reference to FIG. 2. The generated control signals are fed to the CCD 12 and V driver 52.

In keeping with the control signals from the TG 51, the V driver 52 generates vertical control signals V1 through V8 for driving vertical shift registers 62-1 through 62-n of the CCD 12, to be discussed later with reference to FIG. 2. The vertical control signals generated by the V driver 52 (i.e., a vertical register driver) are supplied to the CCD 12.

FIG. 2 is a schematic view depicting the major internal structure of the CCD 12.

As shown in FIG. 2, the CCD 12 has photodiodes 61-1-1 through 61-n-m arranged in m rows and n columns. The n columns of the photodiodes 61-1-1 through 61-n-m are connected to the vertical shift registers 62-1 through 62-n respectively.

In the description that follows, the photodiodes 61-1-1 through 61-n-m will be generically referred to as the photodiode 61 if there is no specific need to distinguish the individual photodiodes. Likewise the vertical shift registers 62-1 through 62-n will be simply referred to as the vertical shift register 62 where there is no need to distinguish the individual vertical shift registers.

The photodiodes 61-1-1 through 61-1-m in the leftmost column are connected to the vertical shift register 62-1; the photodiodes 61-2-1 through 61-2-m in the second column from left are connected to the vertical shift register 62-2; and so on. The photodiodes 61-n-1 through 61-n-m in the n-th column are connected to the vertical shift register 62-n.

The vertical shift register 62-1 includes a plurality of registers capable of retaining electrical charges accumulated in the photodiodes 61-1-1 through 61-1-m connected to the registers, respectively. The vertical shift register 62-1, linked to the horizontal shift register 63, shifts the retained electrical charges one place at a time and has the shifted charges supplied to the horizontal shift register 63.

The CCD 12 is supplied with vertical control signals V1 through V8 from the V driver 52. As will be discussed later with reference to FIG. 3, the individual registers in the vertical shift register 62-1 are each supplied with one of the vertical control signals V1 through V8. Under control of the vertical control signals V1 through V8, the vertical shift register 62-1 retains and shifts the above-mentioned electrical charges.

A substrate voltage is applied to the CCD 12 in the form of a SUB (substrate) signal from the V driver 52. The signal causes the electrical charges accumulated in those of the photodiodes 61-1-1 through 61-1-m which are designated by the vertical control signals V1, V3, V5 and V7 to be transferred to the vertical shift register 62-1. The transferred electrical charges are shifted one place at a time, downward as viewed in FIG. 2, under control of the vertical control signals V1 through V8 so that the charges are transferred successively to the horizontal shift register 63.

Each of the vertical shift registers 62-2 through 62-n has the same structure as the vertical shift register 62-1 and operates in the same manner as the latter. Thus, the remaining vertical shift registers will not be discussed further in structure or in operation.

Figure 3:
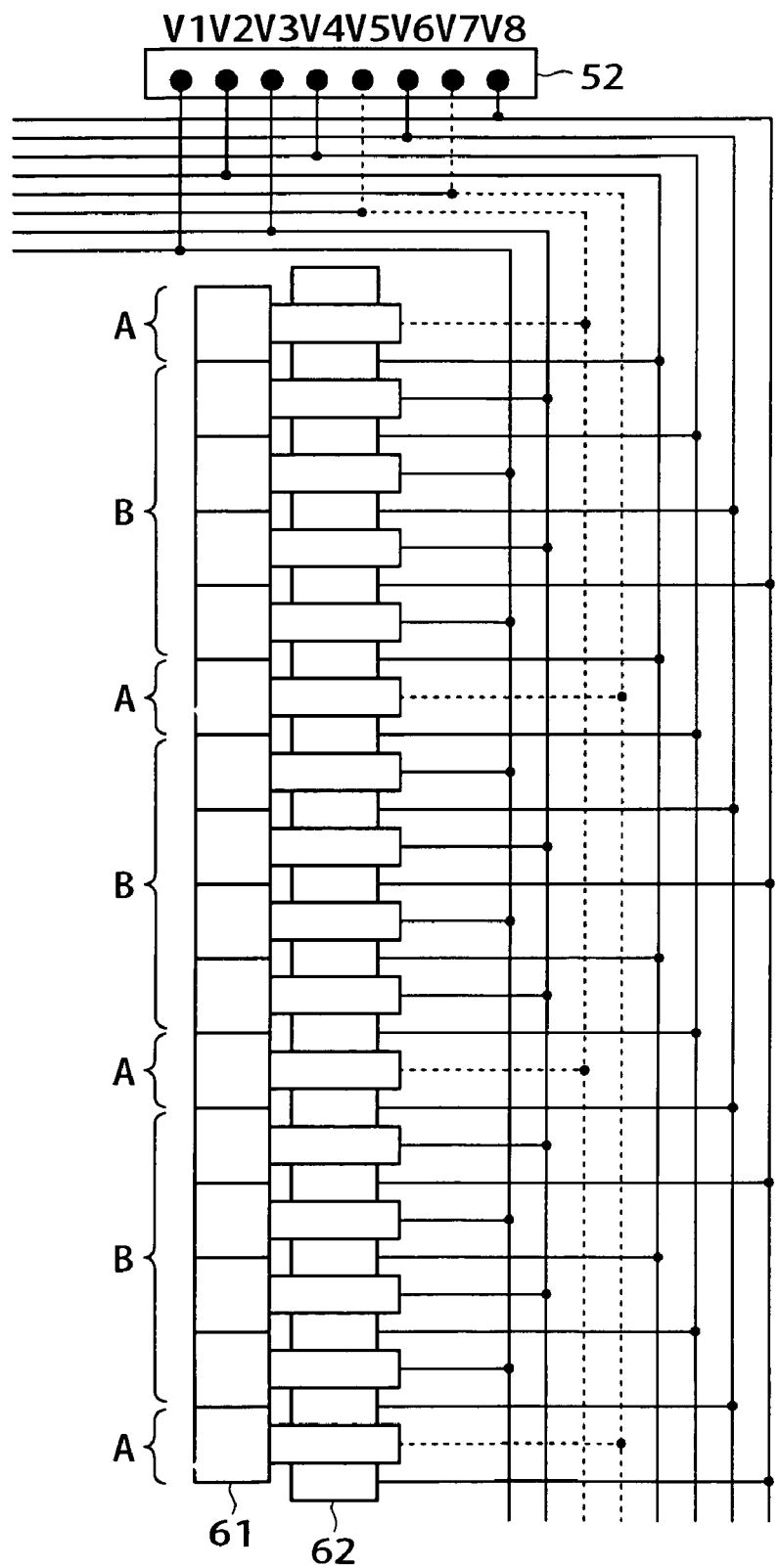
FIG. 3 is a schematic view illustrating typical connections between vertical control signals V1 through V8 shown in FIG. 2 on the one hand, and part of vertical shift registers on the other hand.

FIG. 3 is a schematic view illustrating typical connections between the vertical control signals V1 through V8 on the one hand, and part of the vertical shift register 62 on the other hand.

As shown in FIG. 3, every second register making up the vertical shift register 62 is connected to the photodiode 61. Each register coupled with the photodiode is connected to the vertical control signals V1, V3, V5 or V7. The other registers are each linked to the vertical control signals V2, V4, V6 or V8.

For example, when the vertical control signals V1, V3, V5 and V7 are input to the vertical shift register 62, the electrical charges accumulated in all the photodiodes 61 are transferred to the vertical shift register 62.

In another example, when the vertical control signals V5 and V7 alone are input to the vertical shift register 62, only the electrical charges in those photodiodes 61 (designated by reference character A in FIG. 3) to which the signals V5 and V7 are input are transferred to the vertical shift register 62. The electrical charges in the photodiodes 61 designated by reference character B in FIG. 3 are discharged, not transferred. In this case, the electrical charge from one out of every five individual registers is captured.

Returning to FIG. 2, the horizontal shift register 63 is made up of a plurality of registers each retaining an electrical charge of one photodiode from each of the vertical shift registers 62-1 through 62-n connected to the registers, respectively. In the horizontal shift register 63, the retained electrical charges are shifted one place at a time before being sent successively out of the CCD 12.

Each individual register in the horizontal shift register 63 is connected to a discharge drain and to a column selection discharge gate for determining whether to discharge electrical charges through that discharge drain (none shown). The gates permit selection of the electrical charges to be transferred out of the CCD 12.

When an RG signal fed by the TG 51 causes a voltage to be fed to a given column selection discharge gate, only the electrical charge of the column associated with the discharge drain linked to the voltage-fed column selection discharge gate is selectively discharged. The other electrical charges are shifted left one place (as viewed in FIG. 2) under control of horizontal control signals (H1 and H2) coming from the TG 51, so that the charges are transferred successively out of the CCD 12.

In the manner described above, the CPU 31 causes the TG 51 to control the CCD 12 so as to regulate the amount of image data to be captured.

Figure 4:
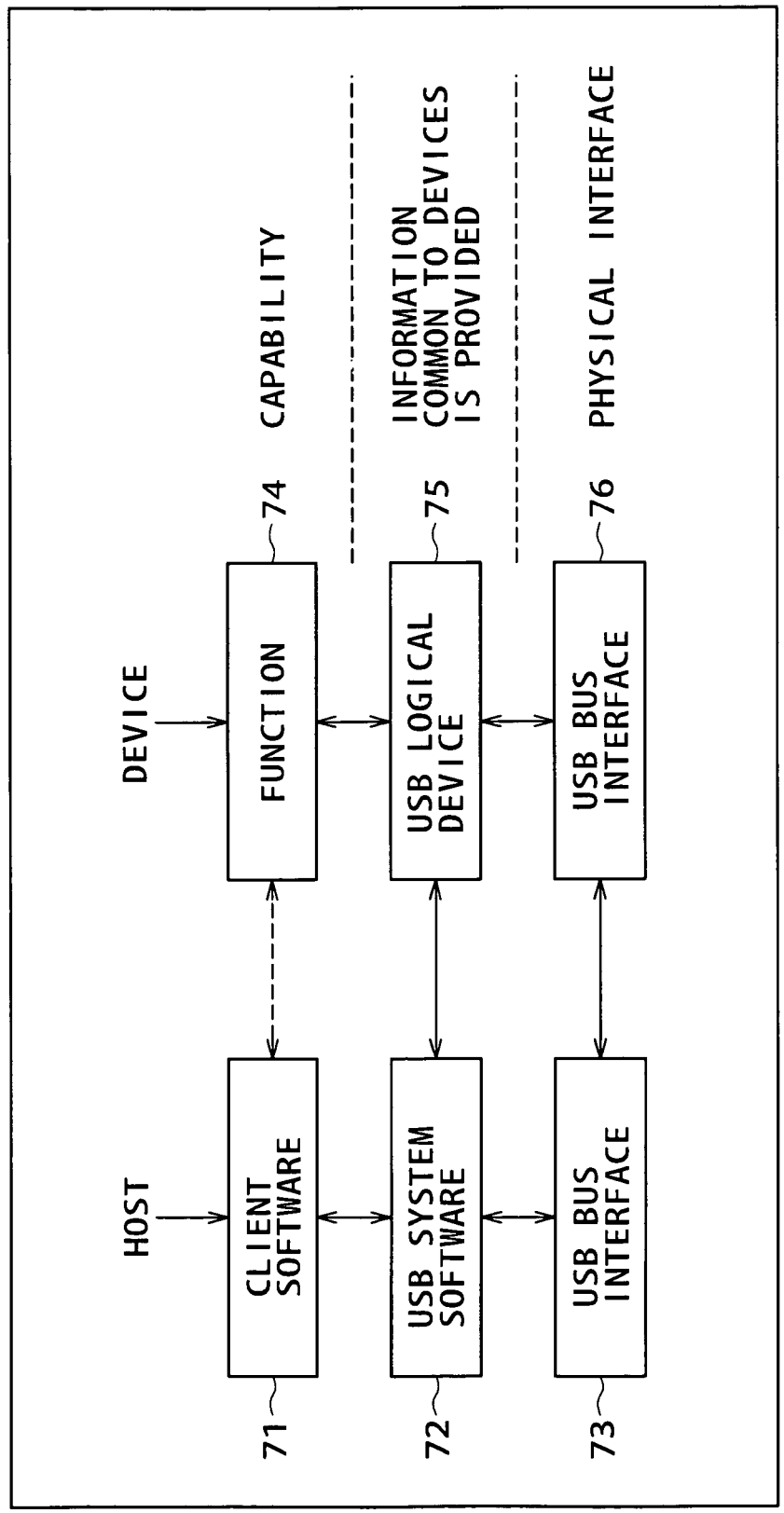
FIG. 4 is a schematic view indicating how USB-based communications typically take place.

FIG. 4 is a schematic view indicating how USB-based communications typically take place.

A USB-based communication setup involves two communicating terminals: a host that controls the communication, and a device that communicates with the host.

On the host side, client software 71 executed by the CPU 31 in FIG. 1 or the like gives a communication instruction to USB system software 72 executed by the USB controller 40 in FIG. 1. In turn, the USB system software 72 controls communications carried out through a USB bus interface 73 which is a physical interface.

On the device side, a function 74 (specific to the device) gives a communication instruction to a USB logical device 75. In turn, the USB logical device 75 controls communications through a USB bus interface 76, a physical interface.

The client software 71 and function 74 carry out relevant processes therebetween based on information exchanged in a USB-based communication. The USB system software 72 and USB logical device 75 control the USB-based communication so as to exchange requested information through the USB bus interfaces 73 and 76.

The USB controller 40 in FIG. 1 is compatible with USB version 2.0 (i.e., a communication standard) and capable of communicating at transfer rates of up to 480 Mbps. If the communicating device connected to the USB connector 41 via a USB cable is a device compatible with USB version 1.1 and capable of communicating at transfer rates of up to 12 Mbps or up to 1.5 Mbps, the USB controller 40 also accommodates that device operating at a reduced transfer rate. Information about the ongoing communication is supplied to the CPU 31. Given the communication information, the CPU 31 controls accordingly the amount of image data captured by the CCD 12 as well as a compression rate used in a compression process on the image data.

Furthermore, the USB controller 40 measures an actual transfer rate that may vary under changing loads in a manner to be described later, and supplies information about the measurements to the CPU 31. Based on the measurement information received, the CPU 31 controls the amount of image data captured by the CCD 12 and the compression rate for the image data.

Figure 5:
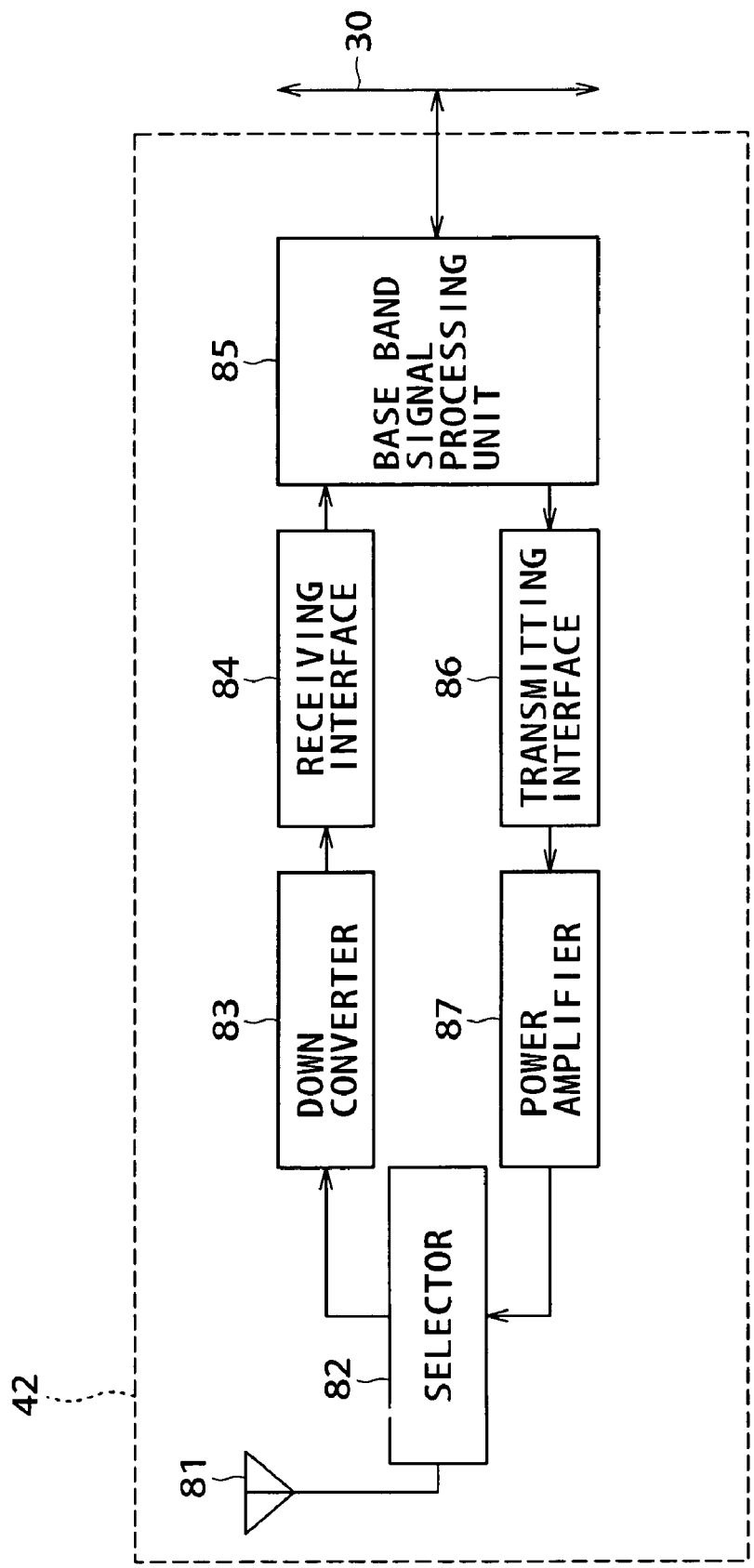
FIG. 5 is a block diagram detailing a typical structure of a wireless communication unit in the mobile phone of FIG. 1.

FIG. 5 is a block diagram detailing a typical structure of the wireless communication unit 42 included in FIG. 1.

In this structure, an antenna 81 receives radio waves from another device and supplies the received signal to a selector 82. The antenna 81 also transmits signals from the selector 82 to the other device using radio waves. The selector 82 demodulates the signal received from the antenna 81, such as through CDMA (code division multiple access) arrangements, and sends the demodulated signal to a down converter 83.

The down converter 83 converts the carrier frequency of the demodulated signal thus acquired to a low frequency before forwarding the demodulated signal to a receiving interface 84. The receiving interface 84 subjects the acquired demodulated signal to an A/D conversion process, for example, for conversion to digital form. The resulting digital signal is sent to a base band signal processing unit 85.

From the digital signal sent by the receiving interface 84, the base band signal processing unit 85 extracts received data through packet filtering, error signal handling and other processes in accordance with suitable criteria. The received data thus extracted are placed onto the bus 30. The base band signal processing unit 85 also acquires data via the bus 30, supplements the acquired data with control signals or the like, and forwards the supplemented data to a transmitting interface 86. The transmitting interface 86 converts the acquired digital signal to an analog signal and feeds the resulting analog signal to a power amplifier 87. The power amplifier 87 amplifies the received signal into an outgoing signal and sends the amplified signal via the selector 82 to the antenna 81 for output.

The maximum communication speed for the wireless communication unit 42 may vary depending on the carrier in use and/or the communication standards in effect.

The wireless communication unit 42 varies its transfer rate so as to accommodate the maximum communication speed of the opposite device communicating with the unit 42. Information about the changed transfer rate is supplied to the CPU 31. Based on the supplied information, the CPU 31 controls the amount of image data captured by the CCD 12 and the rate at which the image data are compressed.

In addition, the wireless communication unit 42 measures the ongoing transfer rate varying with different loads in a manner to be described later, and feeds information about the measurements to the CPU 31. In keeping with the supplied information, the CPU 31 controls the amount of image data captured by the CCD 12 and the compression rate for the image data.

Figures 6A, 6B:
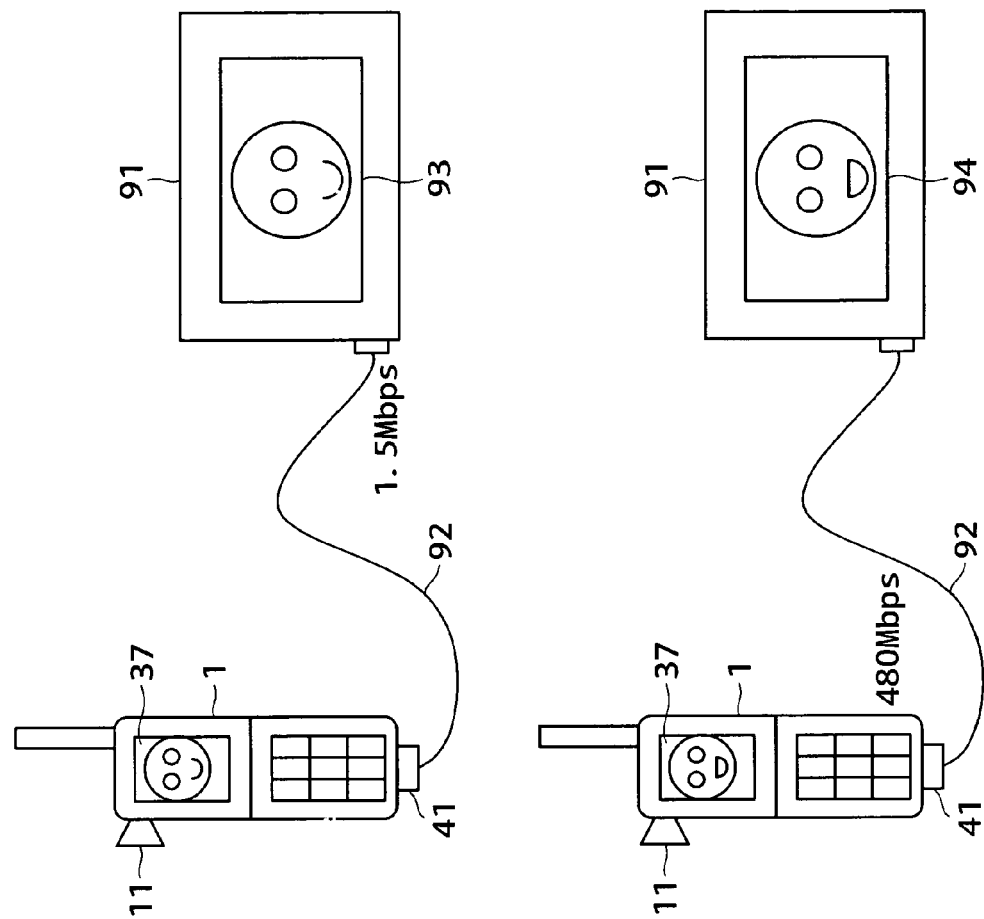
FIG. 6A is a schematic view of a typical system configuration for displaying image data acquired by the mobile phone in FIG. 1.
FIG. 6B is a schematic view of another typical system configuration for displaying image data acquired by the mobile phone in FIG. 1.

What follows is a description of how the CPU 31 controls the amount of image data captured by the CCD 12 in accordance with the maximum communication speed of the opposite communication device connected via the USB connector 41. FIGS. 6A and 6B are schematic views of system configurations in which the image data acquired by the mobile phone 1 in FIG. 1 are transferred through a USB cable to another device for display.

In FIG. 6A, the mobile phone 1 is connected to a PDA (personal digital assistant) 91 via a USB cable 92 connected to the USB connector 41 furnished at the bottom of the phone. Incident light entering the CCD 12 through the lens unit 11 at the top left corner (as viewed in FIG. 6A) of the mobile phone 1 is subjected to photoelectric conversion, whereby moving image data are acquired. Under control of the CPU 31, a moving image corresponding to the acquired moving image data appears on the LCD 37 at the top front of the mobile phone 1 while being supplied concurrently to the PDA 91 through the USB cable 92. The supplied moving image is displayed on a display unit at the front of the PDA 91.

Alternatively, the lens unit 11, LCD 37, and USB connector 41 may be located elsewhere on the mobile phone 1.

If the maximum transfer rate for the PDA 91 in the system configuration of FIG. 6A is assumed to be 1.5 Mbps, then the maximum speed of communication between the mobile phone 1 and the PDA 91 is 1.5 Mbps as well. In other words, even if the mobile phone 1 has a communication facility capable of communicating at a maximum communication speed of 480 Mbps, the maximum speed of communication between the phone 1 and the PDA 91 is brought down to that of the PDA 91.

When the CPU 31 of the mobile phone 1 determines that the maximum speed of communication with the PDA 91 is very low, the CPU 31 causes the CCD 12 to capture lesser quantities of moving image data than before, and transfers the reduced amount of captured moving image data to the PDA 91. This causes the display unit of the PDA 91 to display a low-quality moving image 93. That is, the CPU 31 causes the CCD 12 to reduce the amount of image data it captures to a level where the USB controller 40 can normally transmit the data at a maximum communication speed that the PDA 91 is capable of. In this manner, the mobile phone 1 supplies moving picture data to the PDA 1 without data overflows or missing frames taking place in a USB-based communication setup at the maximum transfer rate of 1.5 Mbps.

Where the PDA 91 has the maximum transfer rate of 480 Mbps as shown in FIG. 6B, i.e., where large quantities of image data can be normally transmitted thereto, the CPU 31 allows the CCD 12 not to reduce the amount of moving image data it captures, and supplies the captured moving image data to the PDA 91. This causes the display unit of the PDA 91 to display a high-quality moving image 94.

In the manner described, the CPU 31 causes the CCD 12 to control the amount of moving image data it captures in keeping with the processing capability of the destination device to which the moving image data are supplied.

More specifically, the CPU 31 acquires information about the destination device through the USB controller 40, selects an image quality mode based on the acquired information, causes the CCD 12 and related parts to acquire moving image data in controlled quantities, and supplies the moving image data to the PDA 91 through the USB cable 92.

Figure 7:
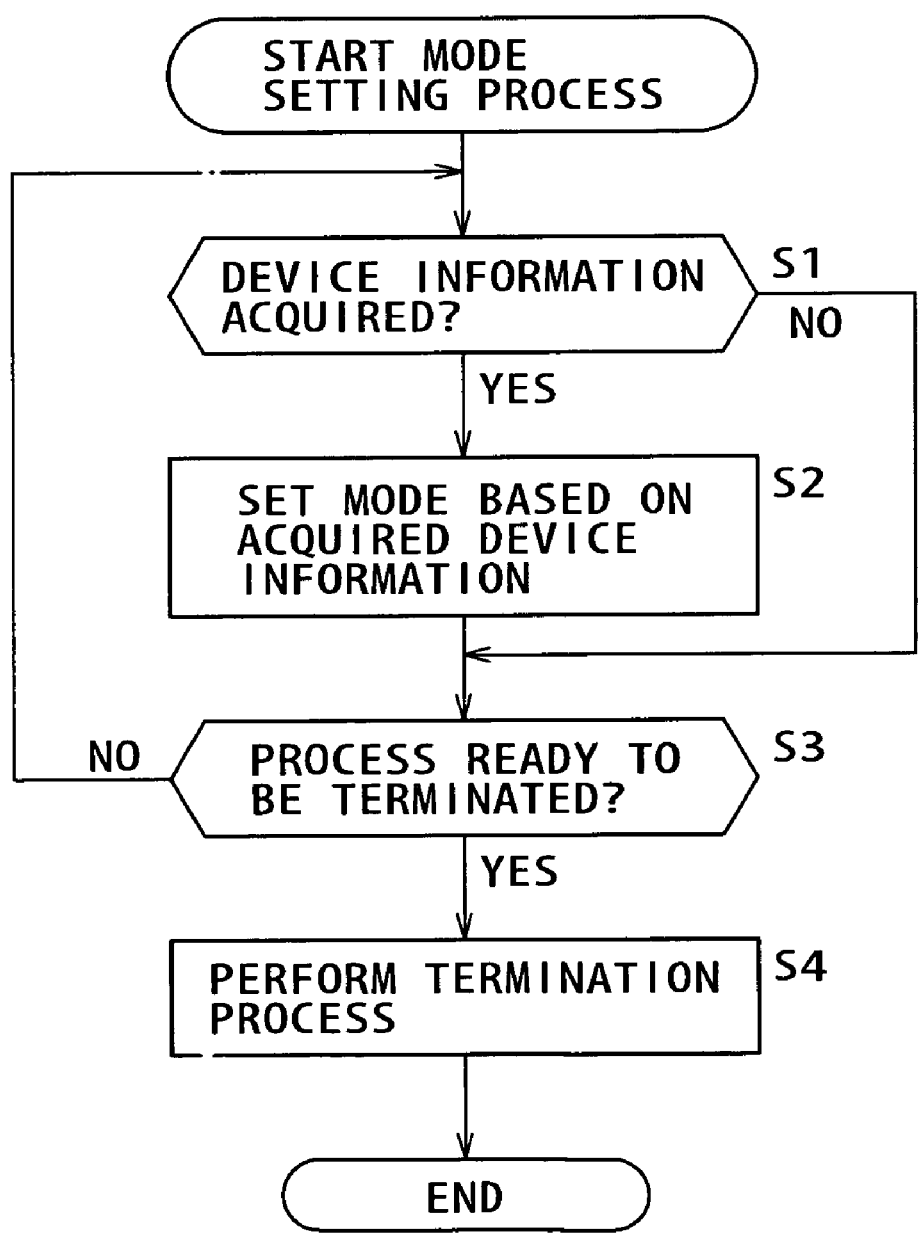
FIG. 7 is a flowchart of steps constituting a mode setting process associated with the capture of moving image data by the system configurations of FIGS. 6A and 6B.

Described below with reference to the flowchart of FIG. 7 is a typical mode setting process associated with the capture of moving image data by the CPU 31 in the system configurations of FIGS. 6A and 6B.

An imaging process is started, for example, by the user's instruction. In step S1, the CPU 31 initially requests from the USB controller 40 device information about the PDA 91, including its capability to transfer moving image data, and determines whether the requested device information has been acquired from the USB controller 40.

If in step S1 the device information has been acquired from the USB controller 40, the process goes to step S2. In step S2, the CPU 31 selectively sets one of two predetermined modes associated with the capture of moving image data by the CCD 12. One of the two modes is a high-quality mode in which a predetermined amount of image data is transferred, and the other is a low-quality mode in which a reduced amount of image data is transferred. After setting the mode, the process reaches step S3.

If in step S1 the device information has not been acquired, the process skips step S2 and goes directly to step S3.

In step S3, the CPU 31 determines whether the mode setting process is ready to be terminated. If the mode setting process is not ready to be terminated, the process returns to step S1 and the subsequent steps are repeated.

If in step S3 the mode setting process is ready to be terminated, the process goes to step S4, and a termination process is performed to terminate the mode setting process.

Figure 8:
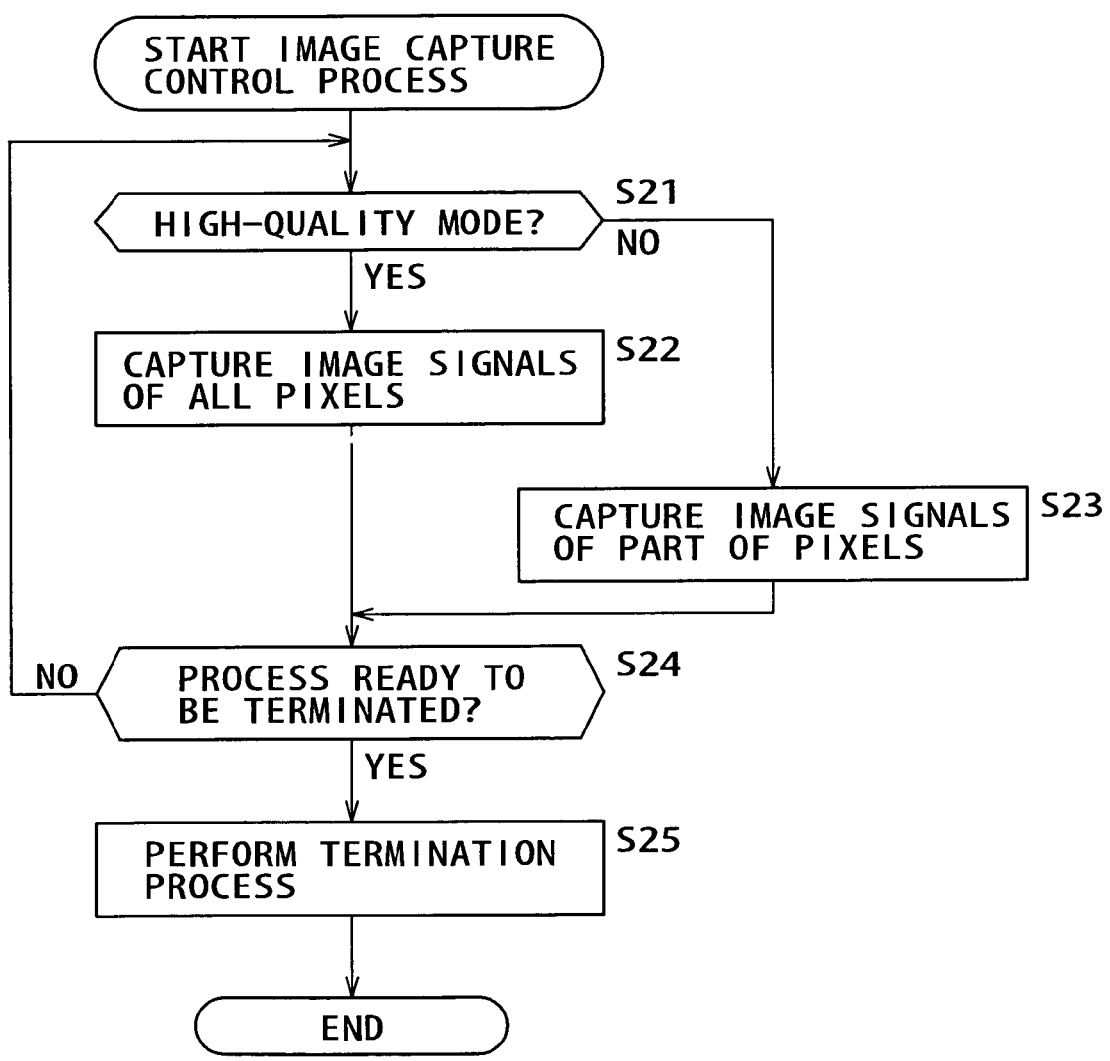
FIG. 8 is a flowchart of steps constituting an image capture control process.

After the CPU 31 has established the mode related to the capture of moving image data as described above, the CPU 31 proceeds to carry out an image capture control process. How this process is performed is described below with reference to the flowchart of FIG. 8.

In step S21, the CPU 31 determines whether the high-quality mode is currently set in connection with the capture of moving image data. If the high-quality mode is in effect, the process goes to step S22. In step S22, the CPU 31 causes the CCD 12 and TG 51 in FIG. 1 to capture image signals of all pixels in order to generate high-quality moving image data.

When a first field of a moving image is to be extracted in the high-quality mode, the electrical charges accumulated in the photodiodes 61 corresponding to the vertical control signals V3 and V7 in FIG. 3 are transferred to the vertical shift register 62; when a second field of the moving image data is to be extracted, the electrical charges held in the photodiodes 61 corresponding to the vertical control signals V1 and V5 are transferred to the vertical shift register 62; and so on. The CPU 31 thus controls the TG 51 in a manner causing the CCD 12 to capture the electrical charges of all photodiodes 61 so as to output one frame of moving image data.

After the processing of step S22 is completed, the process goes to step S24.

If in step S21 the mode currently associated with the capture of moving image data is not the high-quality mode (i.e., when the low-quality mode is set), then the process goes to step S23. In step S23, the CPU 31 causes the CCD 12 and TG 51 to capture the image signals of part of the pixels in order to generate low-quality moving image data.

When one frame of electrical charges is to be extracted in the low-quality mode, only the electrical charges accumulated in the photodiodes 61 corresponding to the vertical control signals V5 and V7 in FIG. 3 (i.e., photodiodes 61 designated by reference character A in FIG. 3) are transferred to the vertical shift register 62. This process reduces the amount of data in the vertical direction by four-fifths, as illustrated in FIG. 9.

The CCD 12 utilizes a primary color filter arrangement having red (R), green (G) and blue (B) filters laid out in the Bayer pattern to capture incident light. As shown in FIG. 9, the photodiodes are arranged in two types of horizontal rows alternating in the vertical direction. In one type of row, the photodiodes from which to extract electrical charges corresponding to the G signal are positioned side by side with the photodiodes from which to extract electrical charges corresponding to the B signal. In the other type of row, the photodiodes from which to extract electrical charges corresponding to the R signal are positioned side by side with the photodiodes from which to extract electrical charges corresponding to the G signal.

Figure 9:
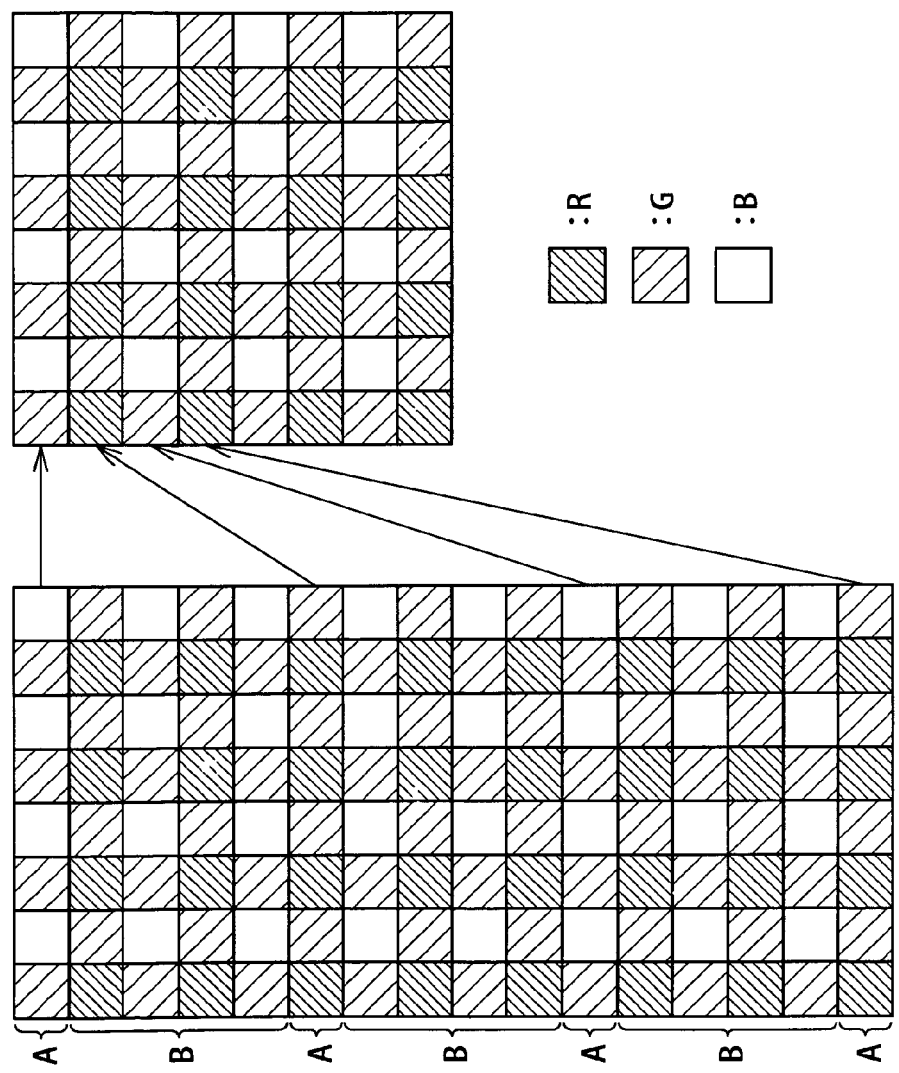
FIG. 9 is a schematic view sketching how the amount of image data is illustratively reduced.

More specifically, in the first row at the top of FIG. 9, the photodiodes from which to extract electrical charges corresponding to the G signal are arranged side by side with the photodiodes from which to extract electrical charges corresponding to the B signal. In the second row from the top, the photodiodes from which to extract electrical charges corresponding to the R signal are laid out side by side with the photodiodes from which to extract electrical charges corresponding to the G signal.

In the low-quality mode, of the photodiodes 61 arranged as described above, those in the rows designated by reference character A in FIG. 9 have their electrical charges captured. This reduces the amount of data in the vertical direction by four-fifths.

The electrical charges transferred to the vertical shift registers 62 are shifted one place at a time to the horizontal shift register 63 as described above. Under control of the RG signal fed from the TG 51 to the CCD 12, the horizontal shift register 63 discharges the electrical charges other than those of relevant columns. For example, under control of the RG signal, the horizontal shift register 63 retains the electrical charges of every fifth column while discharging those of the remaining four columns through the drains. Getting the horizontal shift register 63 to operate in this manner reduces the amount of data captured in the horizontal direction by four-fifths.

In the manner described, the CPU 31 causes the CCD 12 to capture the electrical charges of part of its photodiodes in order to generate one frame of moving image data.

Returning to FIG. 8, the CPU 31 completes the process of step S23 before reaching step S24.

In step S24, the CPU 31 determines whether the image capture control process is ready to be terminated. If the process is not ready to be terminated, the process returns to step S21 and the subsequent steps are repeated.

If in step S24 the image capture control process is ready to be terminated, for example, based on the user's input, the process goes to step S25. In step S25, the CPU 31 performs a termination process to terminate this image capture control process.

The moving image data captured as described above are sent by the CPU 31 to the USB controller 40 or related components. From there, the data are fed to the PDA 91 through the USB cable 92. In this manner, the mobile phone 1 supplies moving image data to the PDA 91 without incurring data overflows or missing frames. It should be noted that signals may be read from the photodiodes 61 in any other manner than what was described above provided the amount of retrieved electrical charges is suitably controlled in keeping with the image quality mode in effect.

The CPU 31 may compress the captured moving image data before supplying the data to the PDA 91. In this case, the compression rate may be varied with the ongoing communication speed, i.e., depending on the current mode in which moving picture data are captured. At this point, the amount of electrical charges read from the CCD 12 will not be changed in accordance with the image quality mode in effect as discussed above.

Figure 10:
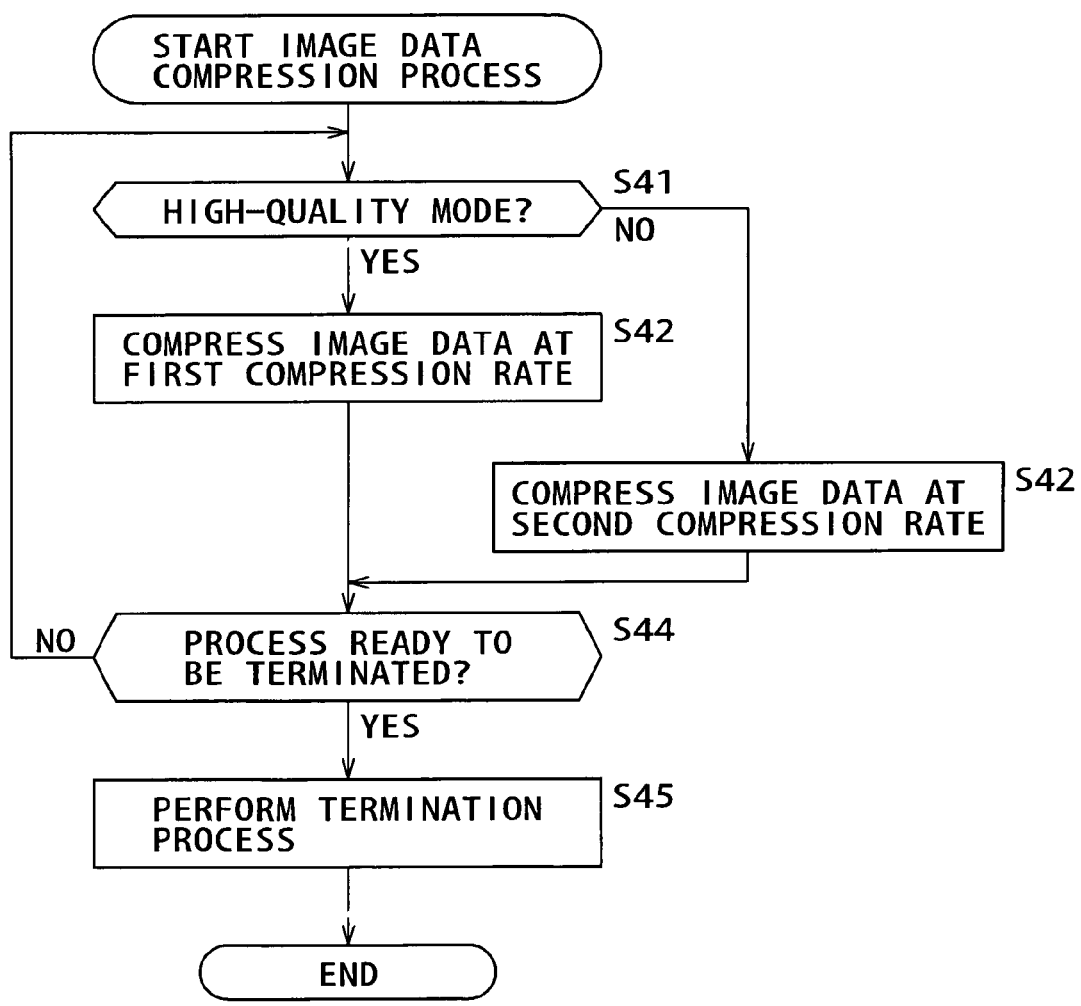
FIG. 10 is a flowchart of steps constituting an image data compression process.

Described below with reference to the flowchart of FIG. 10 is a typical image data compression process carried out by the CPU 31.

In step S41, the CPU 31 determines whether the high-quality mode is currently in effect. If the high-quality mode has been established, the process moves to step S42. In step S42, the CPU 31 compresses moving image data at a first compression rate for high-quality image data compression. Step S42 is followed by step S44.

If in step S41 the high-quality mode has not been established (i.e., the low-quality mode is in effect), the process goes to step S43. In step S43, the CPU 31 compresses the moving image data at a second compression rate (which is higher than the first rate) for low-quality image data compression. Step S43 is followed by step S44.

In step S44, the CPU 31 determines whether the image data compression process is ready to be terminated. If the process is not ready to be terminated, the process returns to step S41 and the subsequent steps are repeated.

If in step S44 the image data compression process is ready to be terminated for some reason, the process goes to step S45. In step S45, the CPU 31 performs a termination process to terminate the image data compression process.

In the manner described, the CPU 31 compresses the captured moving image data at a compression rate commensurate with the currently established mode in which the moving picture data are captured (i.e., moving image capture mode), and supplies the compressed data to the USB controller 40 or related components. From there, the compressed data are sent to the PDA 91 through the USB cable 92. In this manner, the mobile phone 1 can supply moving image data to the PDA 91 without incurring data overflows or missing frames.

There can be other variations of this invention each diversely combining the embodiments described above. In a commonly conceived variation, the amount of electrical charges read from the CCD 12 in the high-quality mode (where high-speed data transfer is available) may be raised for lower data compression, and the amount of electrical charges read from the CCD 12 in the low-quality mode (where low-speed data transfer alone is feasible) may be reduced for higher data compression. In another variation where priority is given to the compression process, the amount of electrical charges read from the CCD 12 in the high-quality mode (for high-speed data transfer) may be reduced for lower data compression, and the amount of electrical charges retrieved from the CCD 12 in the low-quality mode (only for low-speed data transfer) may be raised for higher data compression.

Figure 11:
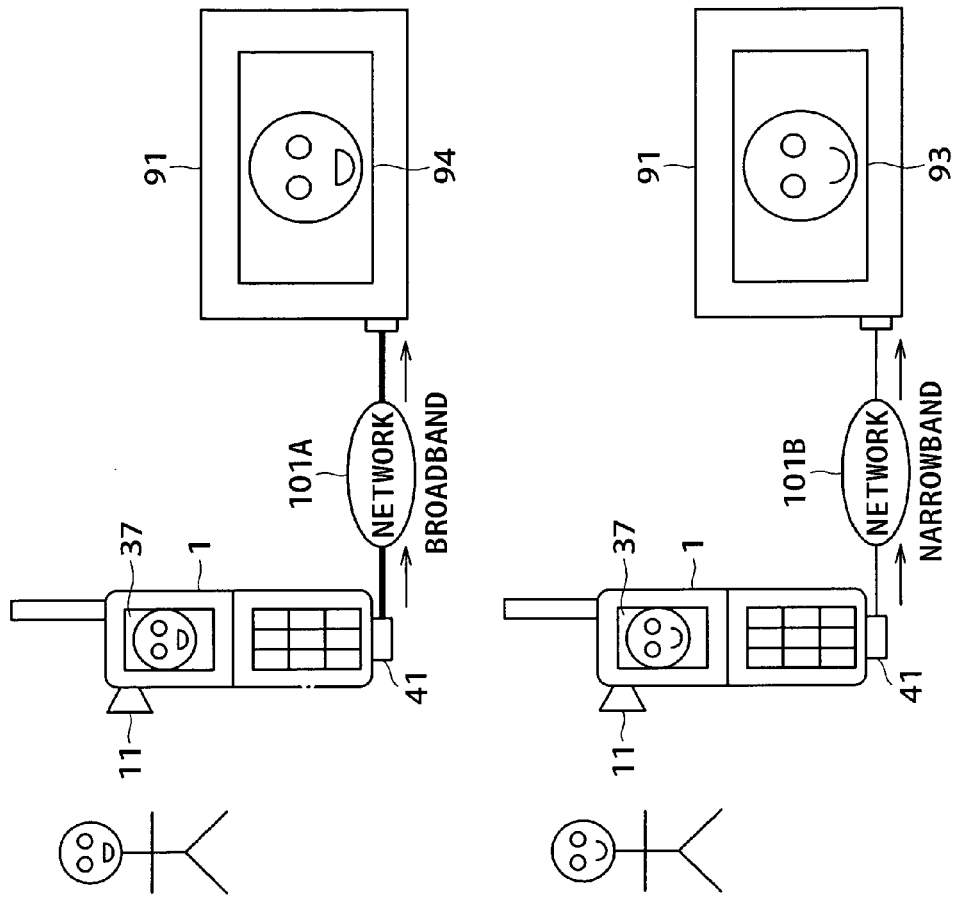
FIG. 11A is a schematic view of another typical system configuration for displaying image data acquired by the mobile phone in FIG. 1.
FIG. 11B is a schematic view of another typical system configuration for displaying image data acquired by the mobile phone in FIG. 1.

The foregoing description has focused on how to change the moving image capture mode in accordance with the communication speed of the PDA 91, the destination to which the moving image data are transmitted. Where the mobile phone 1 and PDA 91 are connected via a network 101, such as a LAN (local area network) or the Internet as shown in FIGS. 11A and 11B, the moving image capture mode may be controlled in keeping with the bandwidth and traffic status of the network 101. The network traffic status may be determined, for example, upon initial establishment of connection between the devices involved. More specifically, a signal is issued from one of the connected devices to the other to find out who the other party is and how capable the opposite device is in communication. At this point, the traffic status may be determined by measuring how long it takes to receive a response signal from the other party responding to the issued signal.

For example, where the network 101A is a broadband network as shown in FIG. 11A or is not congested, i.e., where high-speed communication is available, the CPU 31 of the mobile phone 1 sets the high-quality mode as the moving image capture mode to generate high-quality moving image data, and supplies the generated data to the PDA 91. In turn, the PDA 91 displays on its display unit a high-quality moving image 94 corresponding to the high-quality moving image data acquired.

In another example, where the network 101B is a narrowband network as shown in FIG. 11B or is congested, i.e., where high-speed communication is unavailable, the CPU 31 of the mobile phone 1 sets the low-quality mode as the moving image capture mode to generate low-quality moving image data in reduced quantities, and supplies the generated data to the PDA 91. In turn, the PDA 91 displays on its display unit a low-quality moving image 93 corresponding to the low-quality moving image data acquired.

Figure 12:
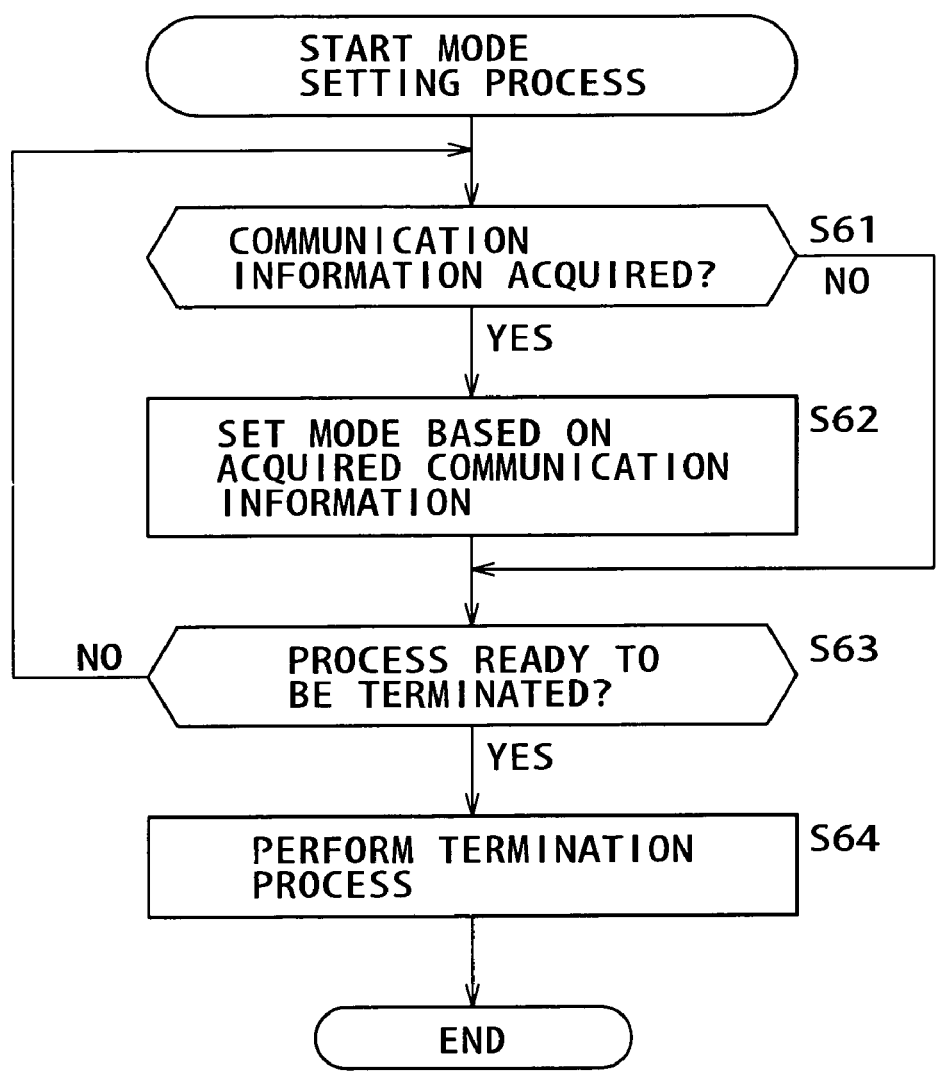
FIG. 12 is a flowchart of steps constituting a mode setting process applicable to the system configurations of FIGS. 11A and 11B.

Described below with reference to the flowchart of FIG. 12 is a typical mode setting process to be carried out in the case outlined above.

Initially, the CPU 31 causes the USB controller 40 to generate communication information including the current communication speed and acquires that information via the bus 30. In step S61, the CPU 31 determines whether the communication information has been acquired. If the communication information has been acquired, the process proceeds to step S62. In step S62, the CPU 31 establishes an appropriate moving image capture mode based on the acquired communication information. Step S62 is followed by step S63.

If in step S61 the communication information has not been acquired, the CPU 31 skips step S62 and goes directly to step S63.

In step S63, the CPU 31 determines whether the mode setting process is ready to be terminated. If the process is not ready to be terminated, the process returns to step S61 and the subsequent steps are repeated.

If in step S63 the mode setting process is ready to be terminated, for example, based on the user's instructions, step S64 is reached. In step S64, the CPU 31 performs a termination process to terminate the mode setting process.

In the manner described above, the CPU 31 can establish a moving image capture mode commensurate with the current communication speed of the USB controller 40. In keeping with changes in the traffic status of the network 101 between the mobile phone 1 and the PDA 91 to which moving image data are sent, the CPU 31 can continuously supply normal moving image data to the PDA 91 for the display of a moving image reflecting the supplied data without incurring data overflows or missing frames.

In the examples above, the network 101 was shown intervening between the mobile phone 1 that supplies moving image data on the one hand and the PDA 91 that acquires the moving image data on the other hand. However, the invention is not limited to this setup. Any suitable communication equipment such as repeaters may be arranged to intervene between the mobile phone 1 and the PDA 91.

As another alternative, it is possible for the CPU 31 to establish a suitable moving image capture mode based on instructions from the PDA 91 to which moving image data are to be supplied.

Described below with reference to the flowchart of FIG. 13 is how the mode setting process is typically performed where a moving image capture mode is established on the basis of a request from the party that receives the moving image data.

In step S81, the CPU 31 determines through the USB controller 40 whether an image quality designation request has been acquired from the PDA 91. If the request has been acquired, the process proceeds to step S82. In step S82, the CPU 31 updates the setting of the moving image capture mode in accordance with the acquired image quality designation request. Step S82 is followed by step S83.

If in step S81 the image quality designation request has not been acquired from the PDA 91, the CPU 31 skips step S82 and goes directly to step S83.

In step S83, the CPU 31 determines through the USB controller 40 whether a designation cancel request has been acquired from the PDA 91. If the designation cancel request has been acquired, the process proceeds to step S84. In step S84, the CPU 31 restores the initial mode setting updated in step S82. Step S84 is followed by step S85.

If in step S83 the designation cancel request has not been acquired, the CPU 31 skips step S84 and goes directly to step S85.

In step S85, the CPU 31 determines whether the mode setting process is ready to be terminated. If the process is not ready to be terminated, the process returns to step S81 and the subsequent steps are repeated.

If in step S85 the mode setting process is ready to be terminated, for example, based on the user's instructions, the process goes to step S86. In step S86, the CPU 31 performs a termination process to terminate the mode setting process.

That is, if the CPU 31 acquires an image quality destination request from the PDA 91, the destination to which moving image data is to be supplied, then the CPU 31 uses the requested mode unless and until a designation cancel request is received. The acquired request is given priority over any other conditions for determining the mode setting. Once the designation cancel request is acquired, the CPU 31 restores the initial mode setting in effect before the image quality designation request was acquired.

In the manner described above, the CPU 31 can establish the moving image capture mode based on the request from the PDA 91. This makes it possible, for example, for the user of the PDA 91 to designate a desired moving image quality while viewing the actual moving image displayed on the display unit.

It is possible for the mobile phone 1 to exchange moving image data wirelessly with another mobile phone using the wireless communication unit 42 as depicted in FIG. 14A, or to supply moving image data to the PDA 91 connected with the USB connector 41 as shown in FIG. 14B. In the setup of FIG. 14A where the wireless communication unit 42 is utilized for wireless communication, the maximum communication speed is 9,600 bps; in the setup of FIG. 14B where the USB controller 40 is employed for wired communication, the maximum communication speed is 480 Mbps.

As described, the communication speed may vary depending on which communication device is being used. The CPU 31 may thus set the mode in accordance with the communication device utilized to supply moving image data.

The setup of FIG. 14A, for example, involves mobile phones 1A and 1B each having the same structure as that of the mobile phone 1 and operating in the same manner as the latter. In the setup, incident light entering the lens unit 11 at the top left corner of the mobile phone 1A is subjected to photoelectric conversion by the CCD 12 therein, whereby moving image data are obtained. The data thus acquired are supplied from the mobile phone 1A to the mobile phone 1B in a wireless communication at communication speeds of up to 9,600 bps. In this case, the CPU 31 of the mobile phone 1A sets the low-quality mode for the capture of moving image data.

When small quantities of moving image data are captured in the low-quality mode thus established, the CPU 31 of the mobile phone 1A causes a low-quality moving image corresponding to the captured moving image to appear on the display 37 at the front of the phone 1A, and forwards the moving image data to the wireless communication unit 42. From there, the moving image data are transferred to the mobile phone 1B via the antenna 81 at the top right corner of the mobile phone 1A.

The CPU 31 of the mobile phone 1B acquires the transmitted moving image data through the antenna 81 at the top right corner of the phone 1B, and displays a low-quality moving image 93 corresponding to the acquired data on the display 37 at the front of the phone 1B.

In the setup of FIG. 14B, incident light entering the lens unit 11 at the top left corner of the mobile phone 1 is subjected to photoelectric conversion by the CCD 12 therein, whereby moving image data are obtained. The data thus acquired are supplied from the mobile phone 1 to the PDA 91 in a USB-based communication at communication speeds of up to 480 Mbps. In this case, the CPU 31 of the mobile phone 1 sets the high-quality mode for the capture of moving image data.

When small quantities of moving image data are captured in the high-quality mode thus established, the CPU 31 of the mobile phone 1 causes a high-quality moving image corresponding to the captured moving image to appear on the display 37 at the front of the phone 1, and supplies the data to the USB controller 40. From there, the moving image data are transferred to the PDA 91 through the USB cable 92 connected with the USB connector 41 furnished at the bottom of the phone 1.

Upon acquiring the moving image data, the PDA 91 causes its display unit to display a high-quality moving image 94 corresponding to the acquired data.

Described below with reference to the flowchart of FIG. 15 is a typical mode setting process to be carried out in the case outlined above.

Initially, the CPU 31 in step S101 controls the USB controller 40 and wireless communication unit 42 to acquire therefrom information about their communication capabilities, and determines whether the communication device to be used is capable of high-speed communication. If the communication device is capable of high-speed communication, the process goes to step S102 and the high-quality mode is set. The CPU 31 then terminates the mode setting process. If in step S101 the communication device is found to be incapable of high-speed communication, the process proceeds to step S103 to establish the low-quality mode, before terminating the mode setting process.

In the manner described above, the CPU 31 sets the appropriate mode for the capture of moving image data in accordance with the capability of the communication device to be used.

Alternatively, as shown in FIG. 16A, the CPU 31 may cause the CCD 12 to capture still images of a predetermined level of quality on the basis of requests from the PDA 91 that seeks to acquire moving image data. In such a case, there is no need to transfer still images in real-time. That means large quantities of still image data can be transferred normally. For that reason, the still images may be captured in a predetermined mode regardless of the currently established mode for the capture of moving image data. For example, where moving image data are to be transferred in the low-quality mode, still images of high quality can be captured if the still image capture mode is set for high quality on the mobile phone 1.

Figure 17:
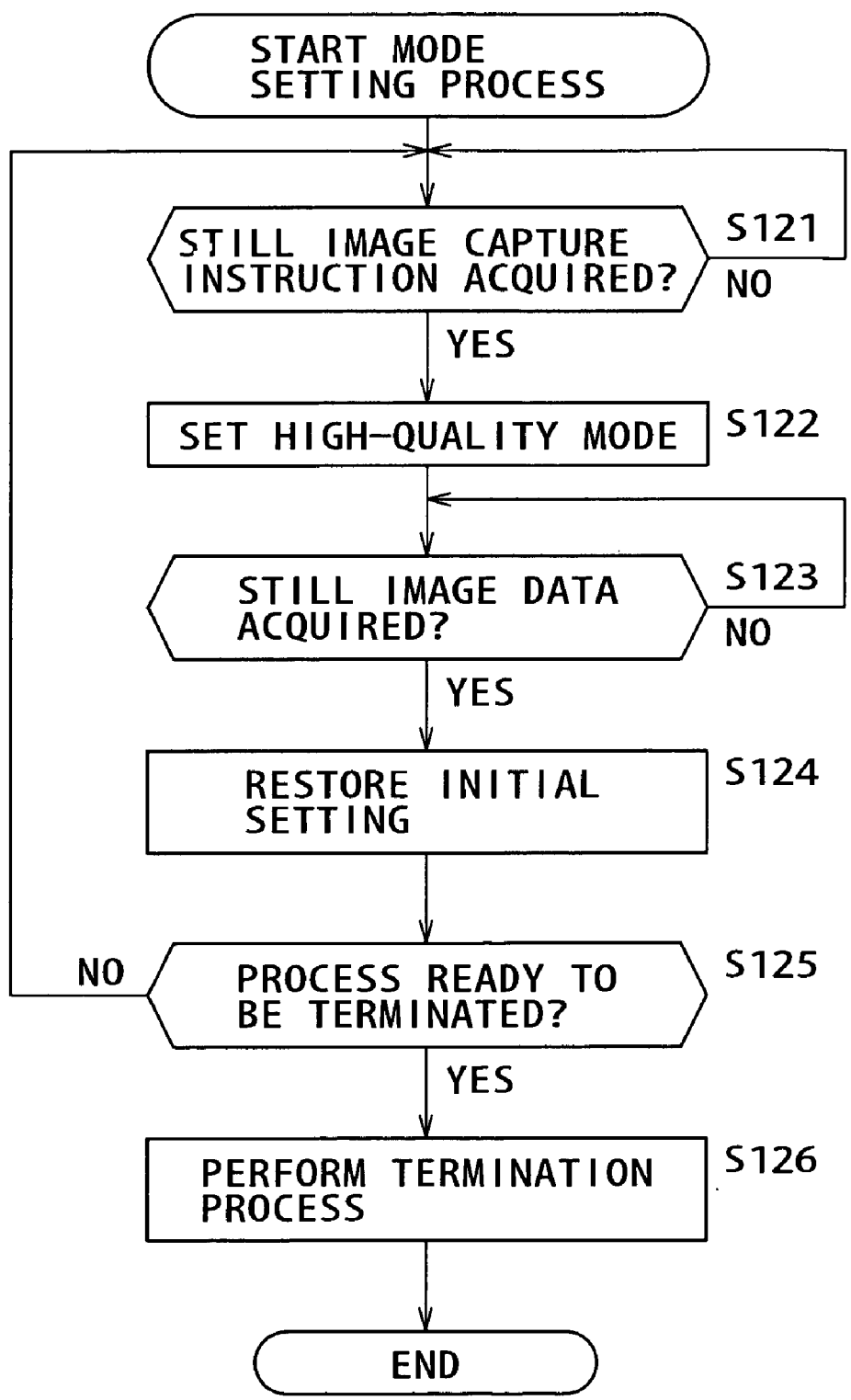
FIG. 17 is a flowchart of steps constituting a process of setting a high-quality mode in which to capture still image data based on a request from a PDA in the system configurations of FIGS. 16A and 16B.

Described below with reference to the flowchart of FIG. 17 is how the mode setting process is performed when a still image is captured in the high-quality mode on the basis of a request from the PDA 91.

Initially, the CPU 31 in step S121 determines through the USB controller 40 whether a still image capture instruction has been acquired. The CPU 31 waits until the still image capture instruction is acquired.

When the still image capture instruction has been acquired, the process goes to step S122. In step S122, the CPU 31 establishes the high-quality mode. In step S123, the CPU 31 determines through the CCD 12 whether still image data have been acquired. The CPU 31 waits until the still image data are acquired.

When the CCD 12 has captured a still image and thereby acquired the still image data, the process goes to step S124. In step S124, the CPU 31 restores the initial mode setting, terminates the still image capture process, and resumes acquiring moving image data.

In step S125, the CPU 31 determines whether the mode setting process is ready to be terminated. If the mode setting process is not ready to be terminated, the process returns to step S121 and the subsequent steps are repeated.

If in step S125 the mode setting process is ready to be terminated, the process goes to step S126. In step S126, the CPU 31 performs a termination process to terminate the mode setting process.

In the manner described, the CPU 31 can acquire still image data representing a high-quality still image based on the request from the PDA 91 regardless of the currently established mode for the capture of moving image data.

The acquired still image data may be supplied to the PDA 91 based on the latter's request as shown in FIG. 16B. This allows a corresponding still image 111 to be displayed on the display unit of the PDA 91. Because the maximum transfer rate for moving image data drops during the transfer of still image data, the CPU 31 of the mobile phone 1 switches to the low-quality mode for the capture of moving image data. At this point, the display unit of the PDA 91 displays a low-quality moving image 93 along with the high-quality still image 111 having been captured. After all the still image data have been transferred, the CPU 31 restores the initial mode setting for the capture of moving image data.

Figure 18:
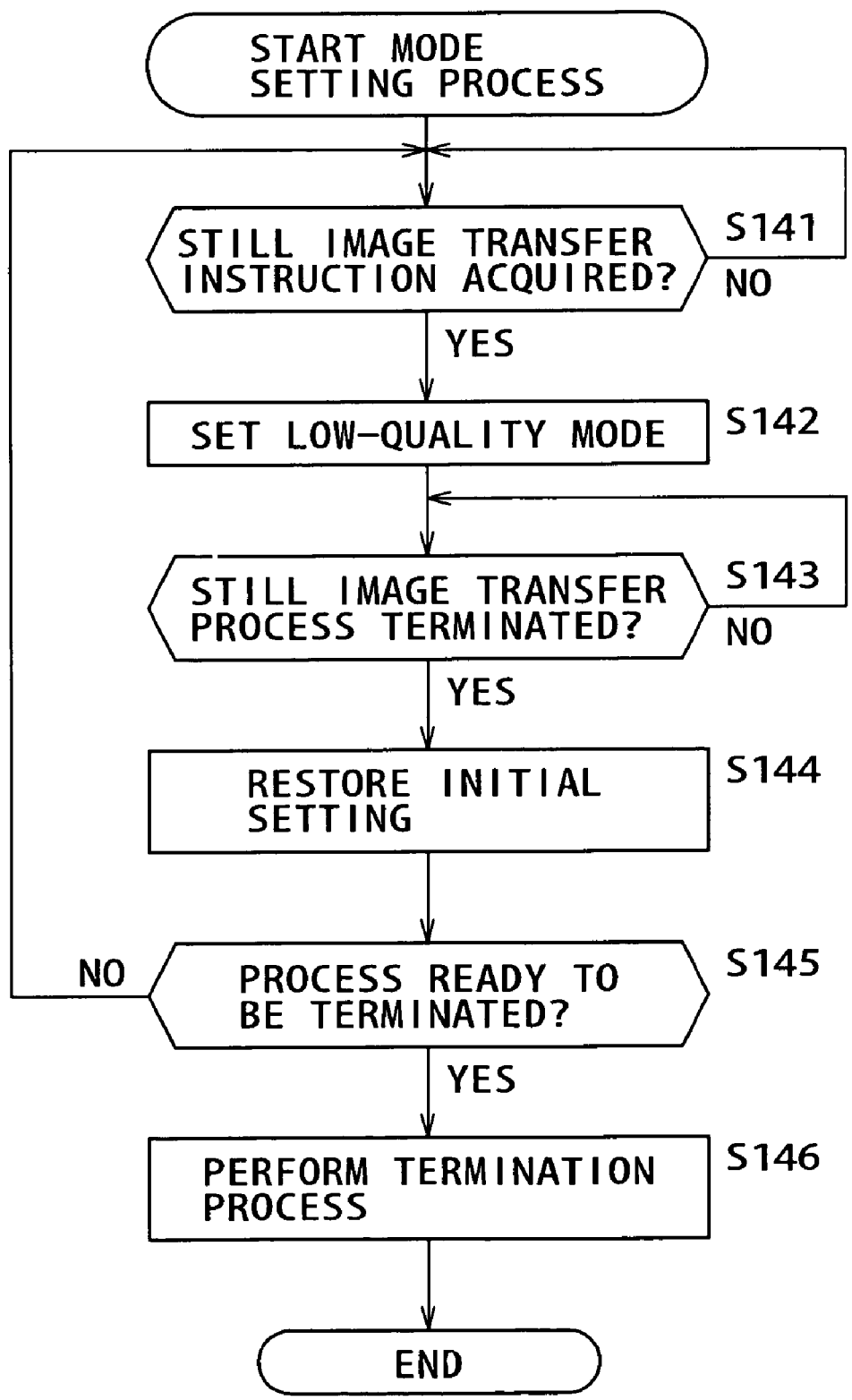
FIG. 18 is a flowchart of steps constituting a mode setting process associated with the transfer of still image data in the system configurations of FIGS. 16A and 16B.

Described below with reference to the flowchart of FIG. 18 is how the mode setting process is carried out for the transfer of still image data.

Initially, the CPU 31 in step S141 determines whether a still image transfer instruction has been acquired. The CPU 31 waits until the still image transfer instruction is acquired. When the still image transfer instruction has been acquired, the process goes to step S142. In step S142, the CPU 31 sets the low-quality mode for the capture of moving image data, and causes the USB controller 40 to start transferring still image data.

In step S143, the CPU 31 determines whether the still image transfer process has ended. The CPU 31 waits until the still image transfer process is brought to an end. When the still image transfer process has ended, the process goes to step S144. In step S144, the CPU 31 restores the initial mode setting thus replacing the low-quality mode that had been set for the capture of moving image data.

In step S145, the CPU 31 determines whether the mode setting process is ready to be terminated. If the mode setting process is not ready to be terminated, the process returns to step S141 and the subsequent steps are repeated. If in step S145 the mode setting process is ready to be terminated, the process goes to step S146. In step S146, the CPU 31 performs a termination process to terminate the mode setting process.

In the manner described above, the CPU 31 of the mobile phone 1 can capture still images based on a request from the PDA 91 and supply the still image data to the latter.

The communication device connected to the mobile phone 1 may be some device other than the PDA 91. For example, as shown in FIG. 19, two mobile phones (1A and 1B) and a PDA 91 may be interconnected via a network 120, such as a LAN or the Internet.

Figure 19:
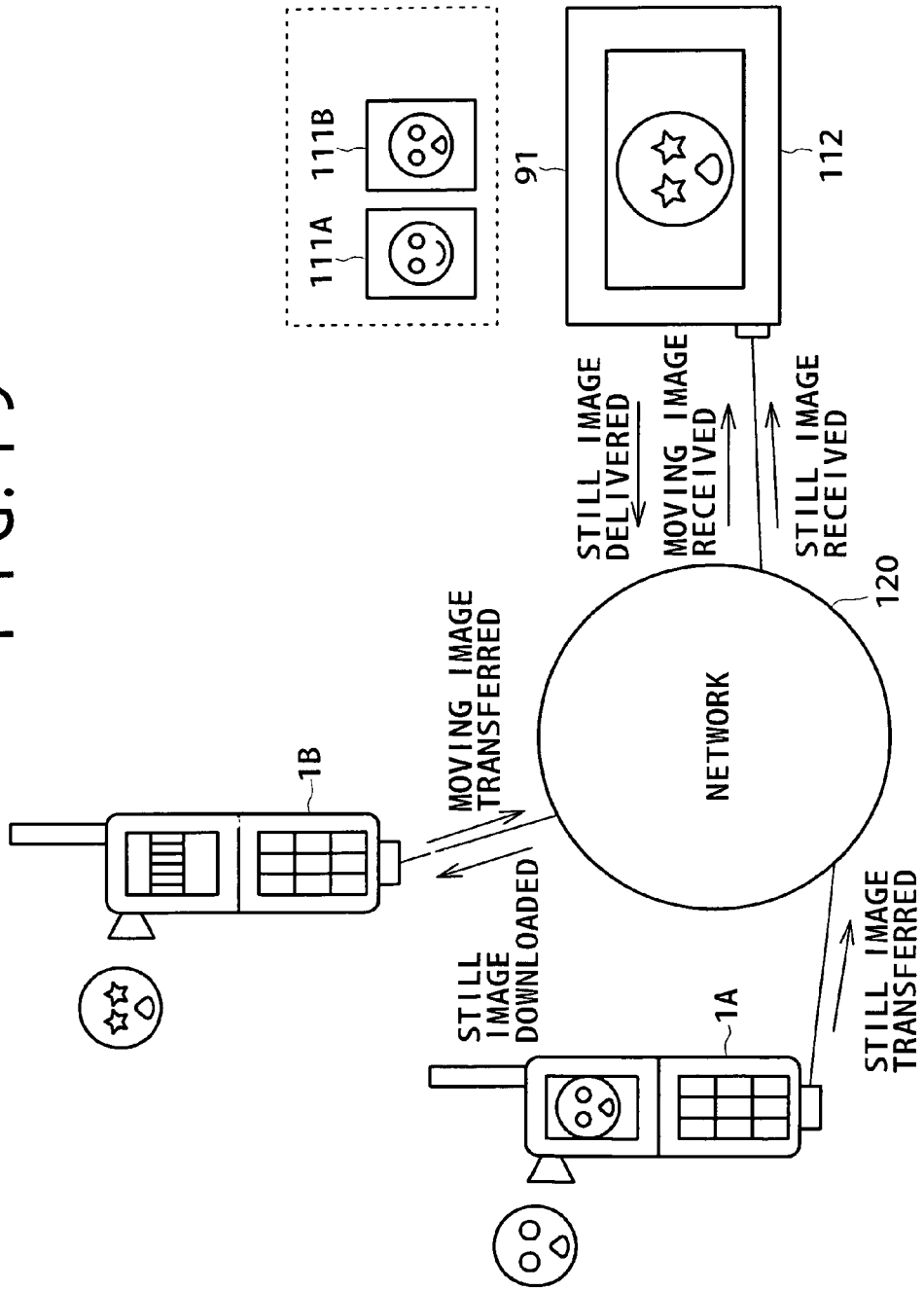
FIG. 19 is a schematic view of yet another typical system configuration for displaying image data acquired by the mobile phone in FIG. 1.

In the example of FIG. 19, the mobile phone 1A captures still images (111A and 111B) and sends the still image data over the network 120 to the PDA 91 for storage into an internal storage unit of the latter. The mobile phone 1B captures moving images and transmits the moving image data over the network 120 to the PDA 91. A moving image 112 corresponding to the moving image data is displayed on the display unit of the PDA 91. The PDA 91 delivers to the mobile phone 1B over the network 120 the still images 111A and 111B which have been acquired from the mobile phone 1A and kept in the internal storage unit of the PDA 91. The mobile phone 1B can thus verify the still images 111A and 111B sent from the mobile phone 1A to the PDA 91.

Figure 20:
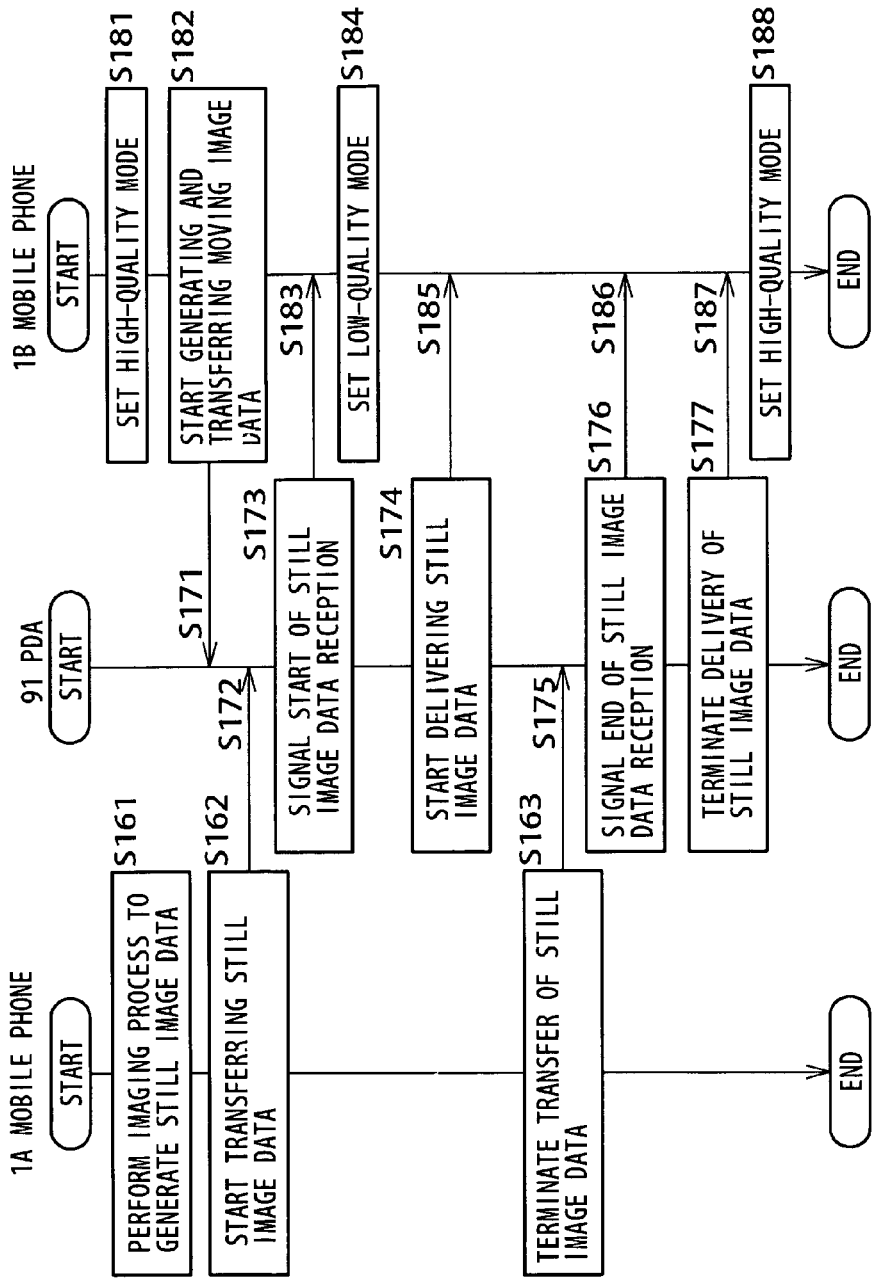
FIG. 20 is a timing chart outlining typical flows of processing by individual devices in the system configuration of FIG. 19.

The processes carried out by the devices involved in the above example are discussed below with reference to the timing chart of FIG. 20.

Initially, the mobile phone 1B in step S181 sets the high-quality mode for the capture of moving images. In step S182, the mobile phone 1B starts generating and transferring moving image data. In keeping with step S182, the PDA 91 in step S171 starts receiving the moving image data transferred from the mobile phone 1B.

In step S161, the mobile phone 1A performs an imaging process to generate still image data. In step S162, the mobile phone 1A starts transferring the still image data. In conjunction with step S162, the PDA 91 in step S172 starts receiving the still image data transferred from the mobile phone 1A.

After starting to receive the still image data in step S172, the PDA 91 reaches step S173 and signals to the mobile phone 1B the start of still image data reception. The mobile phone 1B receiving the signal in step S183 goes to step S184 to set the low-quality mode for the capture of moving image data. Thereafter, the mobile phone 1B generates a reduced amount of moving image data representing low-quality moving images, and transfers the generated data to the PDA 91.

In step S174, the PDA 91 starts delivering the received still image data to the mobile phone 1B. In conjunction with step S174, the mobile phone 1B starts receiving the still image data from the PDA 91 in step S185.

After transferring all the still image data to the PDA 91, the mobile phone 1A reaches step S163 to terminate the still image data transfer and notifies the PDA 91 thereof.

Upon receiving the notice in step S175, the PDA 91 goes to step S176. In step S176, the PDA 91 signals to the mobile phone 1B that the still image data reception has ended. The mobile phone 1B receives the signal in step S186.

After delivering all the still image data to the mobile phone 1B, the PDA 91 goes to step S177 to terminate the still image data delivery and notifies the mobile phone 1B thereof.

Upon receiving the notice in step S187, the mobile phone 1B, already given the signal in step S186, determines that the traffic on the network 120 has dropped and goes to step S188. In step S188, the mobile phone 1B sets the high-quality mode for the capture of moving image data.

In the manner described above, the mobile phone 1B can supply an optimum amount of moving image data to the PDA 91.

In the examples above, the mobile phone 1 was shown utilizing a CCD as its imaging device. However, the invention is not limited to this. Alternatively, a CMOS (complementary metal oxide semiconductor) sensor may be used in place of the CCD.

Figure 21:
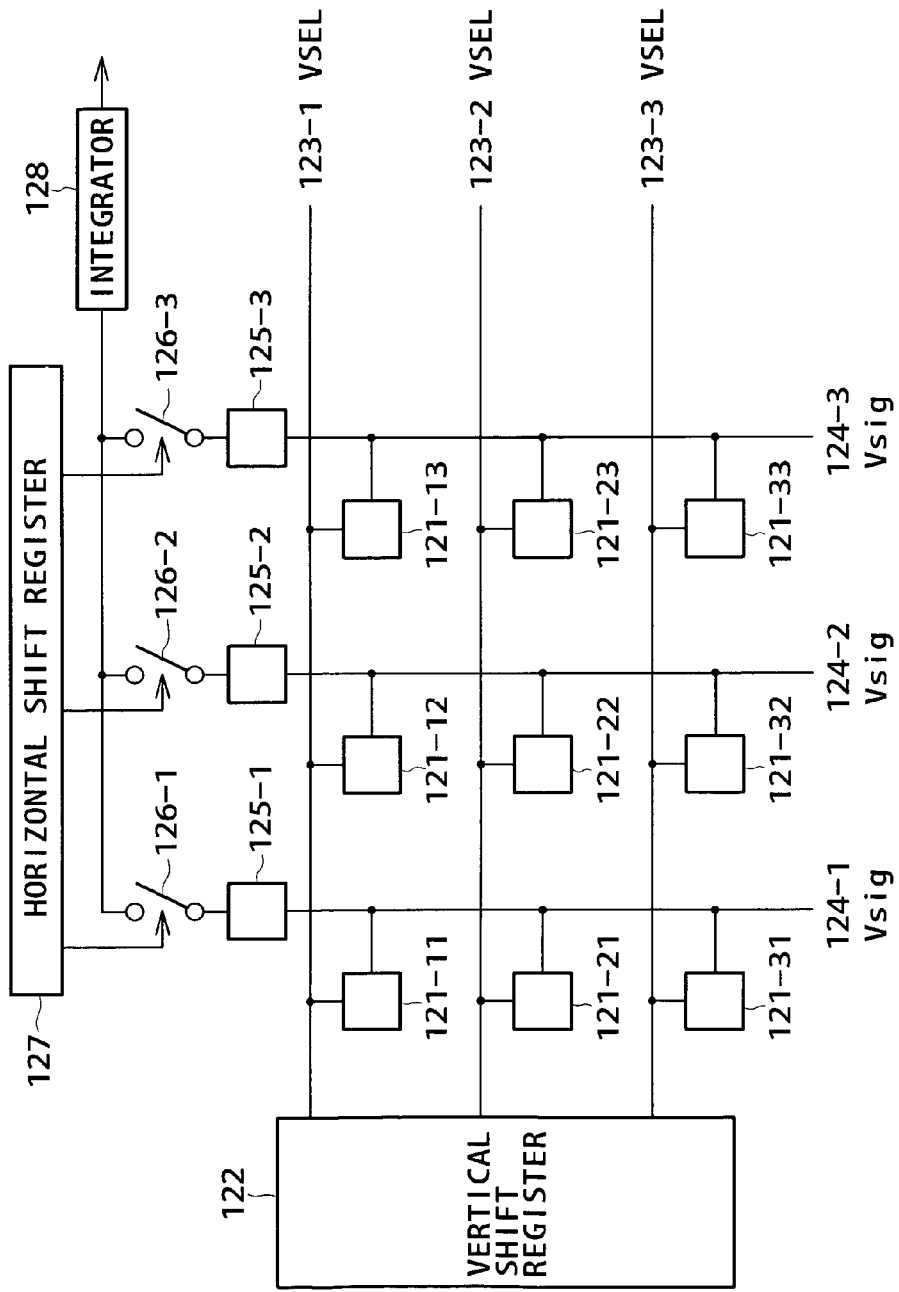
FIG. 21 is a block diagram depicting a typical structure of a CMOS sensor.

FIG. 21 depicts a typical structure of the CMOS sensor.

As shown in FIG. 21, the CMOS sensor may include three rows and three columns of pixels 121-11 through 121-33 having photoelectric conversion elements such as photodiodes, amplifier MOS (metal oxide semiconductor) transistors for reading and amplifying accumulated electrical charges from the elements, and selector MOS transistors for activating the amplifier MOS transistors.

The pixels 121-11 through 121-33 are connected to vertical output lines 124-1 through 124-3 (Vsig). The vertical output lines receive electrical charges that are output from the pixels on the horizontal line selected by control signals 123-1 through 123-3 (VSEL) issued by a vertical shift register 122. As with the CCD 12 explained earlier with reference to FIGS. 1 through 3, the vertical shift register 122 operates under control of the V driver 52 outside the CMOS sensor to output the control signals 123-1 through 123-3 (VSEL).

The electrical charges output onto the vertical output lines per horizontal line are accumulated in storage units 125-1 through 125-3 having cumulative capacitors. When any one of switches 126-1 through 126-3 is selectively activated by a control signal from a horizontal shift register 127, the electrical charge accumulated in the storage unit connected to the activated switch is read out onto an output line VH and supplied to an integrator 128. As in the case of the CCD 12 discussed with reference to FIGS. 1 through 3, the horizontal shift register 127 operates under control of the TG 51 outside the CMOS sensor to supply the control signal to the switches 126-1 through 126-3.

In the above setup, the CPU 31, as with the CCD 12, controls the vertical shift register 122 and horizontal shift register 127 of the CMOS sensor by means of the TG 51 and V driver 52. In so doing, the CPU 31 can select the pixels from which to retrieve electrical charges in accordance with the currently established mode for the capture of moving image data.

That is, as shown in FIG. 22, the CPU 31 selects the pixels from which to extract electrical charges at suitable intervals (e.g., from the pixels marked by circles in FIG. 22) in a CMOS sensor having pixels corresponding to R, G or B arranged in the Bayer pattern as in the case of the CCD 12 shown in FIG. 9. In this manner, the amount of generated image data can be selectively reduced.

The structure above allows the CPU 31 to set a suitable moving image capture mode based on the communication speed and on a request from the communicating party, as in the case of the CCD 12. It is then possible to generate moving image data in quantities commensurate with the mode thus established, whereby a suitable amount of moving image data is supplied.

In the example above, the CMOS sensor was shown having pixels or photo-registers 121-11 through 121-33 in three rows and three columns. However, the invention is not limited to this arrangement. Thus, any number of photo-registers may be furnished as needed.

As described, the mobile phone 1 according to the invention controls the amount of moving image data to be transferred to another communicating apparatus in accordance with diverse external and internal factors. The external factors include the communication capability of the other apparatus and the bandwidth and traffic status of the network via which the two apparatuses are connected. The internal factors include transmission or reception of still images executed by the imaging device of the invention during the transmission of moving images. Under such control of the mobile phone 1, an optimum amount of moving image data can be supplied to the other communicating apparatus.

The amount of moving image data may be determined either by a predetermined program or in consideration of the transmission speed at which the image data are transmitted and the bandwidth currently in effect for the network. Where the amount of data is to be determined by a predetermined program, that program may be arranged to read all pixels in USB-based communication or to read part of the pixels in wireless communication. Where the transmission speed and bandwidth are to be considered, available bands on the network may be monitored by periodically transmitting a PING packet or the like to the other communicating apparatus in order to measure the time required for responses to be returned therefrom. The available bands thus monitored and the communication speed found currently in effect are utilized as a basis for determining the compression rate, i.e., a rate of optimal discrete reduction.

Other factors than those outlined above may also be used for controlling the amount of image data to be transferred. For example, the load on the CPU 31 in the mobile phone 1 may be factored in for control purposes.

Although a mobile phone 1 furnished with a camera function was mainly explained in the foregoing description, the invention is not limited to this. Any other suitable electronic device may take the place of the mobile phone 1, such as a PDA or a personal computer with a camera facility, or a communication-capable digital camera.

Although the mobile phone 1 was described as having two communication facilities, i.e., USB controller 40 and wireless communication unit 42, the invention is not limited to such arrangements. Thus, the mobile phone 1 may have only one suitable communication facility or three or more communication facilities.

These communication facilities may be designed for wired or wireless communication. The communication protocol used for wired communication is not limited to USB; the protocol may be that of IEEE 1394, SCSI, Ethernet®-based IEEE 802.3, or some other suitable standard. Wireless communication may be implemented not only through a carrier over telephone lines but also in the form of short-distance wireless links such as those of IEEE 802.1x, Bluetooth, or infrared-based IrDa.

In the foregoing description, the PDA 91 was shown as the apparatus that seeks to acquire moving image data. However, the invention is not limited to this. Any one of diverse types of electronic apparatuses, such as mobile phones, digital video cameras and TV sets, may be adopted as the device for acquiring the moving image data.

Although a plurality of conditions for the mode setting process were discussed separately in the foregoing description, the invention is not limited to this. That is, the multiple conditions may be applied simultaneously in combination as a basis for setting the mode.

The series of processes or steps described above may be executed either by hardware or by software. For the software-based processing to take place, programs constituting the software may be either incorporated beforehand in the dedicated hardware of a computer or installed upon use from a suitable storage medium into a general-purpose personal computer or like equipment capable of executing diverse functions.

The storage medium that accommodates computer-executable programs to be installed into the computer may be provided in the form of a package medium, such as the magnetic disc 44 (including flexible discs), optical disc 45 (including CD-ROM (compact disc-read only memory) and DVD (digital versatile disc)), magneto-optical disc 46 (including MD (Mini-disc; registered trademark)), or semiconductor memory 47; or in the form of the ROM 32 or flash memory 35 where the programs are stored temporarily or permanently. The programs may be recorded to the storage medium through diverse communication interfaces, such as routers and modems, or via wired or wireless communication media including networks, such as public switched telephone networks, local area networks, the Internet, or digital satellite broadcasting networks.

In this specification, the steps which are stored on the storage medium and which describe the programs to be executed by the computer represent not only processes that are carried out in the depicted sequence (i.e., on a time series basis), but also processes that may be performed in parallel or individually.

As described, the inventive apparatus operated as per the inventive method supplies moving image data to another apparatus in which it is in communication, feeding more specifically an optimum amount of image data to the latter. The apparatus of the invention controls the amount of moving image data to be transferred to the other apparatus in accordance with diverse external and internal factors, the external factors including the communication capability of the other apparatus and the bandwidth and traffic status of the network via which the two apparatuses are connected, and the internal factors including the transmission or reception of still images by the imaging device of the invention during the transmission of moving images. In this manner, the inventive apparatus can supply an optimum amount of moving image data to the other communicating apparatus.

The invention claimed is:

1. An imaging apparatus, comprising:
   imaging means for capturing image data of an object;
   compressing means for compressing the captured image data;
   transmitting means for transmitting the compressed image data to a communication device via a network and data other than the compressed image data; and
   adjusting means for adjusting a compression rate for compressing the captured image data based on a communication speed at which the compressed image data are transmitted by said transmitting means, wherein said adjusting means (i) raises the compression rate for compressing the captured image data from a first rate to a second rate greater than the first rate when said transmitting means, responsive to a request from the communication device to acquire the data other than the compressed image data when the compressed image data is being transmitted to the communication device compressed at the first rate, starts to transmit the data other than the compressed captured image data along with the compressed captured image data, and (ii) restores the compression rate for compressing the captured image data to the first rate after the data other than the compressed image data responsive to the request is transmitted to the communication device.

2. An imaging apparatus according to claim 1, further comprising:
   a plurality of units of said transmitting means; and
   selecting means for selecting any one of said plurality of units of said transmitting means;
   wherein said adjusting means adjusts the compression rate based on the communication speed at which the compressed image data are transmitted by the unit of said transmitting means selected by said selecting means.

3. An imaging method, comprising:
   capturing image data of an object;
   compressing the captured image data;
   transmitting the compressed image data to a communication device via a network and data other than the compressed image data; and
   adjusting a compression rate for compressing the captured image data based on a communication speed at which the compressed image data are transmitted in the transmitting step, wherein the adjusting step (i) raises the compression rate for compressing the captured image data from a first rate to a second rate greater than the first rate when the transmitting step, responsive to a request from the communication device to acquire the data other than the compressed image data when the compressed image data is being transmitted to the communication device compressed at the first rate, starts to transmit the data other than the compressed captured image data along with the compressed captured image data, and (ii) restores the compression rate for compressing the captured image data to the first rate after the data other than the compressed image data responsive to the request is transmitted to the communication device.

4. An imaging method according to claim 3, further comprising selecting any one of a plurality of transmitting units for transmitting the compressed image data, wherein the transmitting step includes controlling the transmission so that the compressed image data is transmitted by the selected transmission unit; and
   the adjusting step adjusts the compression rate based on the communication speed at which the compressed image data are transmitted by the selected transmission unit.

* * * * *